(12) United States Patent
Zafar et al.

(10) Patent No.: US 12,296,539 B2
(45) Date of Patent: May 13, 2025

(54) APPARATUS AND METHODS FOR REMOVABLE SUPPORT STRUCTURES IN ADDITIVE MANUFACTURING

(71) Applicant: DIVERGENT TECHNOLOGIES, INC., Los Angeles, CA (US)

(72) Inventors: Muhammad Faizan Zafar, Long Beach, CA (US); Broc William TenHouten, Rancho Palos Verdes, CA (US); Antonio Bernerd Martinez, El Segundo, CA (US); Keith Allen Fleming, Torrance, CA (US); John Russell Bucknell, El Segundo, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 463 days.

(21) Appl. No.: 15/725,136

(22) Filed: Oct. 4, 2017

(65) Prior Publication Data
US 2018/0311733 A1 Nov. 1, 2018

Related U.S. Application Data

(63) Continuation-in-part of application No. 15/582,409, filed on Apr. 28, 2017.

(51) Int. Cl.
*B29C 64/40* (2017.01)
*B22F 3/02* (2006.01)
(Continued)

(52) U.S. Cl.
CPC .............. *B29C 64/40* (2017.08); *B22F 3/02* (2013.01); *B22F 3/1017* (2013.01); *B22F 3/164* (2013.01);
(Continued)

(58) Field of Classification Search
None
See application file for complete search history.

(56) References Cited

U.S. PATENT DOCUMENTS

| 5,203,226 A | 4/1993 | Hongou et al. |
| 5,386,500 A | 1/1995 | Pomerantz et al. |

(Continued)

FOREIGN PATENT DOCUMENTS

| CN | 105834422 A | 8/2016 |
| CN | 105855546 A | 8/2016 |

(Continued)

OTHER PUBLICATIONS

US 9,202,136 B2, 12/2015, Schmidt et al. (withdrawn)
(Continued)

*Primary Examiner* — Sally A Merkling
*Assistant Examiner* — Ricardo D Morales
(74) *Attorney, Agent, or Firm* — ArentFox Schiff LLP

(57) ABSTRACT

Systems and methods of support structures in powder-bed fusion (PBF) are provided. Support structures can be formed of bound powder, which can be, for example, compacted powder, compacted and sintered powder, powder with a binding agent applied, etc. Support structures can be formed of non-powder support material, such as a foam. Support structures can be formed to include inductive components that can be used to facilitate removal of the support structures in the presence of an external magnetic field. Additionally, support structures can be formed to break when a fluid, such as air or water, creates a force and/or pressure at a connection point interface.

7 Claims, 37 Drawing Sheets

(51) Int. Cl.

| | | |
|---|---|---|
| *B22F 3/10* | (2006.01) | |
| *B22F 3/16* | (2006.01) | |
| *B22F 3/18* | (2006.01) | |
| *B22F 10/28* | (2021.01) | |
| *B22F 10/30* | (2021.01) | |
| *B22F 10/43* | (2021.01) | |
| *B22F 10/47* | (2021.01) | |
| *B22F 10/60* | (2021.01) | |
| *B22F 10/66* | (2021.01) | |
| *B22F 12/55* | (2021.01) | |
| *B22F 12/60* | (2021.01) | |
| *B23K 26/142* | (2014.01) | |
| *B23K 26/342* | (2014.01) | |
| *B23K 26/70* | (2014.01) | |
| *B29C 64/386* | (2017.01) | |
| *B33Y 10/00* | (2015.01) | |
| *B33Y 30/00* | (2015.01) | |
| *B33Y 50/02* | (2015.01) | |

(52) U.S. Cl.
CPC ............. *B22F 3/18* (2013.01); *B22F 10/28* (2021.01); *B22F 10/43* (2021.01); *B22F 10/47* (2021.01); *B22F 10/60* (2021.01); *B22F 10/66* (2021.01); *B23K 26/142* (2015.10); *B23K 26/342* (2015.10); *B23K 26/702* (2015.10); *B29C 64/386* (2017.08); *B33Y 10/00* (2014.12); *B33Y 30/00* (2014.12); *B33Y 50/02* (2014.12); *B22F 10/30* (2021.01); *B22F 12/55* (2021.01); *B22F 12/60* (2021.01); *B22F 2202/01* (2013.01); *B22F 2202/06* (2013.01); *B22F 2998/10* (2013.01); *B22F 2999/00* (2013.01)

(56) References Cited

U.S. PATENT DOCUMENTS

| | | | |
|---|---|---|---|
| 5,387,380 A | 2/1995 | Cima et al. | |
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 6,936,212 B1 | 8/2005 | Crawford | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,119,053 B1 | 2/2012 | Bedal et al. | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,567,013 B2 | 2/2017 | Erlich et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,281 B1 | 5/2017 | Memmen et al. | |
| 9,643,361 B2 | 5/2017 | Liu | |

(56) References Cited

U.S. PATENT DOCUMENTS

| | | |
|---|---|---|
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,828,679 B1 * | 11/2017 | Brooks ..................... B22F 3/24 |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,005,239 B2 | 6/2018 | Versluys et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Vans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |

(56) References Cited

U.S. PATENT DOCUMENTS

| | | |
|---|---|---|
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2004/0084814 A1 | 5/2004 | Boyd |
| 2006/0108783 A1 | 5/2006 | Ni et al. |
| 2010/0044417 A1* | 2/2010 | Bruck .................... B23K 1/018 228/264 |
| 2010/0230039 A1 | 9/2010 | Hubert |
| 2011/0256416 A1 | 10/2011 | Brancher et al. |
| 2013/0119577 A1 | 5/2013 | You et al. |
| 2014/0170012 A1 | 6/2014 | Delisle et al. |
| 2014/0197576 A1 | 7/2014 | Kraibuhler et al. |
| 2014/0277669 A1 | 9/2014 | Nardi et al. |
| 2014/0300017 A1* | 10/2014 | Wighton ................ B29C 64/141 264/40.1 |
| 2014/0368804 A1 | 12/2014 | Lafarre et al. |
| 2015/0197862 A1 | 7/2015 | Engel et al. |
| 2015/0306667 A1* | 10/2015 | Yao ..................... B23K 26/342 419/54 |
| 2015/0343564 A1 | 12/2015 | Bruck et al. |
| 2015/0352639 A1 | 12/2015 | Toyserkani et al. |
| 2016/0001365 A1 | 1/2016 | Blanchet |
| 2016/0167313 A1 | 6/2016 | Swanson et al. |
| 2016/0199959 A1 | 7/2016 | Volk |
| 2016/0222791 A1 | 8/2016 | Rogers |
| 2016/0243619 A1 | 8/2016 | Gothait et al. |
| 2016/0271697 A1 | 9/2016 | Karlen et al. |
| 2016/0281697 A1 | 9/2016 | Coldren et al. |
| 2016/0288476 A1 | 10/2016 | Ducarre |
| 2017/0014907 A1 | 1/2017 | Ng et al. |
| 2017/0014950 A1 | 1/2017 | Okada |
| 2017/0023122 A1 | 1/2017 | Cordingley |
| 2017/0028651 A1* | 2/2017 | Versluys ............... B29C 64/386 |
| 2017/0072467 A1 | 3/2017 | Zehavi et al. |
| 2017/0113344 A1 | 4/2017 | Schönberg |
| 2017/0136539 A1 | 5/2017 | Chou et al. |
| 2017/0151731 A1 | 6/2017 | Ho et al. |
| 2017/0165754 A1 | 6/2017 | Buller et al. |
| 2017/0232512 A1* | 8/2017 | Joerger .................. B29C 64/40 419/53 |
| 2017/0304964 A1 | 10/2017 | Andersen et al. |
| 2017/0341309 A1 | 11/2017 | Piepenbrock et al. |
| 2018/0029306 A1 | 2/2018 | Gold et al. |
| 2018/0050491 A1 | 2/2018 | Ishihara et al. |
| 2018/0099334 A1 | 4/2018 | Peters et al. |

FOREIGN PATENT DOCUMENTS

| | | |
|---|---|---|
| DE | 112014006475 T5 | 12/2016 |
| DE | 201620105052 U1 | 4/2017 |
| JP | 2015-009495 A | 1/2015 |
| JP | 5869182 B1 | 2/2016 |
| JP | 2017-077707 A | 4/2017 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |

(56) References Cited

FOREIGN PATENT DOCUMENTS

| | | | |
|---|---|---|---|
| WO | 2009135938 | A1 | 11/2009 |
| WO | 2009140977 | A1 | 11/2009 |
| WO | 2010125057 | A2 | 11/2010 |
| WO | 2010125058 | A1 | 11/2010 |
| WO | 2010142703 | A2 | 12/2010 |
| WO | 2011032533 | A1 | 3/2011 |
| WO | 2014016437 | A1 | 1/2014 |
| WO | 2014187720 | A1 | 11/2014 |
| WO | 2014195340 | A1 | 12/2014 |
| WO | 2015/014584 | A1 | 2/2015 |
| WO | 2015151834 | A1 | 10/2015 |
| WO | 2015193331 | A1 | 12/2015 |
| WO | 2016116414 | A1 | 7/2016 |
| WO | 2017036461 | A1 | 3/2017 |
| WO | 2017048919 | A1 | 3/2017 |
| WO | 2019030248 | A1 | 2/2019 |
| WO | 2019042504 | A1 | 3/2019 |
| WO | 2019048010 | A1 | 3/2019 |
| WO | 2019048498 | A1 | 3/2019 |
| WO | 2019048680 | A1 | 3/2019 |
| WO | 2019048682 | A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Calignano, F. "Design Optimization of Supports for Overhanging Structures in Aluminum and Titanium Alloys by Selective Laser Melting." Materials & Design, vol. 64, 2014, pp. 203-213 (Year: 2014).*
International Search Report and Written Opinion dated Jan. 24, 2019, regarding PCT/US2018/053875.
Notification of First Office Action received in Chinese Patent Application No. 201821627571.8 dated Aug. 26, 2019, with English Translation.
K.E. Lulay, K. Khan and D. Chaaya: "The Effect of Cryogenic Treatments on 7075 Aluminum Alloy," Journal of Materials Engineering and Performance, Oct. 2002, vol. 11(5), pp. 479-480.
P. Gargarella; S. Pauly; M. Samadi Khoshkhoo; U. Kuhn; and J. Eckert: "Phase Formation and Mechanical Properties of Ti—Cu—Ni—Zr Bulk Metallic Glass Composites," ScienceDirect, Acta Materialia 65 (2014) 259-269.
B.A. Sun; M.X. Pan; D.Q. Zhao; W.H. Wang; X.K. Xi; M.T. Sandor; and Y. Wu: "Aluminum-Rich Bulk Metallic Glasses," Institute of Physics, Chinese Academy of Sciences, Beijing 100190, China, Department of Physics and Astronomy, University of North Carolina, Chapel Hill, NC 27599-3255, ScienceDirect, Scripta Materialia 59 (2008) 1159-1162.
J. Ilcik; D. Koutny; and D. Palousek: "Geometrical Accuracy of the Metal Parts Produced by Selective Laser Melting: Initial Tests," Lecture Notes in Mechanical Engineering, DOI: 10.1007/978-3-319-05203-8_76, © International Publishing Switzerland 2014.
S. Chianrabutra; B.G. Mellor; and S. Yang: "A Dry Powder Material Delivery Device for Multiple Material Additive Manufacturing," Engineering Sciences Unit, Faculty of Engineering and the Environment, University of Southampton, Southampton SO17 1BJ, United Kingdom, 2014.
Di Xie; Sujun Wu; Juan Guan; Lin Yan; and Jinyan Cui: "Effect of Cryogenic Treatment on the Fatigue Crack Propagation Behavior of 7075 Aluminum Alloy," School of Material Science and Engineering, Beihang University, Beijing 100191, China, 2014.
International Search Report and Written Opinion dated Aug. 20, 2018 regarding PCT/US2018/026944.
Bobbio, Lourdes D. et al., "Characterization of the strength of support structures used in powder bed fusion additive manufacturing of Ti-6A1-4V", Additive Manufacturing, 2017 (Online published date: Jan. 19, 2017), vol. 14, pp. 60-68, See abstract; pp. 61-67; table 1; and figure 1.
Lefky, Christopher S. et al., "Dissolvable supports in powder bed fusion-printed stainless steel", 3D Printing and Additive Manufacturing, 2017 (Online published date: Mar. 1, 2017), vol. 4, No. 1, pp. 3-11 See abstract; pp. 4-6; and figures 1, 3.
Calignano, F., "Design optimization of supports for overhanging structures in aluminum and titanium alloys by selective laser melting", Materials & Design, 2014, vol. 64, pp. 203-213, See abstract; and pp. 204-213.
First China Office Action dated Nov. 5, 2018 regarding China Application No. CN201820628314.X.
Notification of the First Rectification dated Feb. 2, 2019, regarding China Application No. CN201820628314.X.
Extended European Search Report received for corresponding European Patent Application EP 18791096.3 dated Dec. 2, 2020.
Communication pursuant to Rules 70(2) and 70a(2) EPC for corresponding European Patent Application EP 18791096.3 dated Dec. 22, 2020.
Martin Erler et al.: "Novel Machine and Measurement Concept for Micro Machining by Selective Laser Sintering Highspeed Lasersintering View project Projekt—LAURA view project", Aug. 31, 2014 (Aug. 31, 2014), XP055711346, [retrived on Jul. 2, 2020].
Lourdes D. Bobbio et al.: "Characterization of the strength of support structures used in powder bed fusion additive manufacturing of Ti—6Al—4V", Additive Manufacturing, vol. 14, Mar. 1, 2017 (Mar. 1, 2017, pp. 60-68, XP055529054, NL ISSN:2214-8604, DOI: 10.1016/j.addma.2017.01.002.
Machine Translation of JP-5869182-B1 (Year: 2016).
Office Action and cited references received for corresponding U.S. Appl. No. 16/155,379 dated Apr. 28, 2021.
Supplementary European Search Report issued for corresponding EP Application No. 18865157 dated Sep. 29, 2021.
Anonymous: "Induction cooking—Wikipedia", 1-12 pages, XP055812744, Sep. 22, 2017; retrieved from the internet: URL:https://en.wikipedia.org/w/index.php?title=Induction cooking&idid=801860714, retrieved on Jun. 10, 2021, the whole document.
Korean version of the Notice of Grounds for Rejection issued in corresponding Korean Patent application No. 10-2019-7034324, dated Jul. 27, 2022.
English language translation of the Notice of Grounds for Rejection issued in corresponding Korean Patent application No. 10-2019-7034324, dated Jul. 27, 2022.
Notice of Reasons for Rejection issued in corresponding Japanese Patent Application No. 2019-558731, dated Oct. 4, 2022.
Examination Report issued in European Patent Application No. 18791096.3, dated Oct. 19, 2022, 5 pages.
Martin Erler et al: "Novel Machine and Measurement Concept for Micro Machining by Selective Laser Sintering Highspeed Lasersintering View project Projekt-LAURA View project", Aug. 31, 2014 (Aug. 31, 2014), XP055711346, Retrieved from the Internet [retrieved on Jul. 2, 2020].
Lourdes D. Bobbio et al: "Characterization of the strength of support structures used in powder bed fusion additive manufacturing of Ti—6Al—4V", Additive Manufacturing, vol. 14, Jan. 19, 2017 (Jan. 19, 2017), NL, pp. 60-68, XP055529054, ISSN: 2214-8604, DOI: 10.1016/j.addma.2017.01.002.
Chinese version of the Notification of the Second Office Action issued for corresponding Chinese Application No. 201810399841.2, dated Apr. 8, 2022.
English language translation of the Notification of the Second Office Action issued for corresponding Chinese Application No. 201810399841.2, dated Apr. 8, 2022.
Japanese version of the Notice of Reasons for Rejection issued for corresponding Japanese Patent Application No. 2019-558731, dated Mar. 8, 2022.
English language translation of the Notice of Reasons for Rejection issued for corresponding Japanese Patent Application No. 2019-558731, dated Mar. 8, 2022.
Erler M et al., "Novel Machine and Measurement Concept for Micro Machining by Selective Laser Sintering", 2014 International Solid Freeform Fabrication Symposium, US, 2014, pp. 12-21, https://hdl.handle.net/2152/88726.
Calignano, F., "Design optimization of supports for overhanging structures in aluminum and titanium alloys by selective laser

(56) References Cited

OTHER PUBLICATIONS melting", Technical Report, Materials and Design, 64:203-213, 2014.

\* cited by examiner

APPARATUS AND METHODS FOR REMOVABLE SUPPORT STRUCTURES IN ADDITIVE MANUFACTURING

CROSS-REFERENCE TO RELATED APPLICATIONS

This application is a continuation-in-part of U.S. application Ser. No. 15/582,409, filed Apr. 28, 2017, the entire content of which is hereby incorporated by reference as if fully set forth herein.

BACKGROUND

Field

The present disclosure relates generally to additive manufacturing, and more particularly, to support structures for additive manufacturing and removal of support structures from build pieces.

Background

Powder-bed fusion (PBF) systems can produce metal structures (referred to as build pieces) with geometrically complex shapes, including some shapes that are difficult or impossible to create with conventional manufacturing processes. PBF systems include additive manufacturing (AM) techniques to create build pieces layer-by-layer. Each layer or slice can be formed by a process of depositing a layer of metal powder and then fusing (e.g., melting and cooling) areas of the metal powder layer that coincide with the cross-section of the build piece in the layer. The process can be repeated to form the next slice of the build piece, and so on until the build piece is complete. Because each layer is deposited on top of the previous layer, PBF can be likened to forming a structure slice-by-slice from the ground up.

The shape of some build pieces in PBF can produce unwanted artifacts. These shapes include overhangs, or portions of the build piece formed by melting powder sections that reside over otherwise unfused powder. To mitigate the negative effects caused by these overhangs, support structures can be used. Conventional techniques for addressing overhangs with support structures, however, have significant drawbacks of their own that can substantially affect the quality of the resulting structures. These and other issues are addressed in the present disclosure.

SUMMARY

Several aspects of support structures and systems and methods for removal of support structures will be described more fully hereinafter.

In one aspect a method for additively manufacturing a component comprises receiving a data model of a structure comprising the component supported by a conductive support material coupled to at least one inductive element. The method for additively manufacturing the component also comprises manufacturing the structure based on the data model, placing the structure in a first magnetic field, and energizing the at least one inductive element. The at least one inductive element is energized to generate a second magnetic field. The second magnetic field has a direction opposite the first magnetic field and is configured to break the support material from the component.

The at least one inductive element can comprise additively manufactured coils configured to provide a predetermined inductance range. Also, energizing the at least one inductive element can comprise applying a voltage to the at least one inductive element. The voltage can have a magnitude sufficient to break the support material without damaging the component. Also, the support material can be tapered at a point of contact to the component to facilitate removal of the support material.

Additively manufacturing the structure can comprise positioning the conductive support material such that a direction and polarity of the second magnetic field facilitates removal of the support material from the component.

In another aspect, an apparatus for separating a support structure from a build piece of a powder bed fusion system is placed within a first magnetic field and comprises at least one inductive element. The support structure is coupled to the at least one inductive element.

The at least one inductive element can comprise additively manufactured coils configured to provide a predetermined inductance range. The support structure can be tapered at a point of contact with the build piece to facilitate removal of the support structure.

The at least one inductive element can be configured to create a second magnetic field and configured to break the support structure from the build piece. The second magnetic field can have a direction which is opposite to that of the first magnetic field.

The at least one inductive element can be configured to receive a voltage, and the voltage can be sufficient in magnitude to create the second magnetic field. The support structure can be removed without damaging the build piece.

In another aspect, there is an apparatus for separating a support structure from a surface of a build piece of a powder bed fusion. The support structure comprises a first outer leg and a second outer leg. The first outer leg is attached to the surface at a first connection point interface; and the second outer leg is attached to the surface at a second connection point interface.

The first and second connection point interfaces can be tapered to break in response to an applied force.

The support structure can further comprise a first inner leg and a second inner leg. The first inner leg can be attached to the surface at a third connection point interface located between the first and second connection point interfaces. The second inner leg can be attached to the surface at a fourth connection point interface located between the first and second connection point interfaces.

The first, second, third, and fourth connection point interfaces can be tapered and form a shell-like feature configured to break upon application of a force. The first and second outer legs can form an outside orifice surrounding the first and second inner legs. The force can be created by a fluid applied at the orifice; and the force can created by a phase change of a fluid applied at the orifice.

Other aspects will become readily apparent to those skilled in the art from the following detailed description, wherein is shown and described only several exemplary embodiments by way of illustration. As will be realized by those skilled in the art, concepts described herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of the concepts described herein will now be presented in the detailed description by way of example, and not by way of limitation, in the accompanying drawings, wherein.

DETAILED DESCRIPTION

Figure 1A:
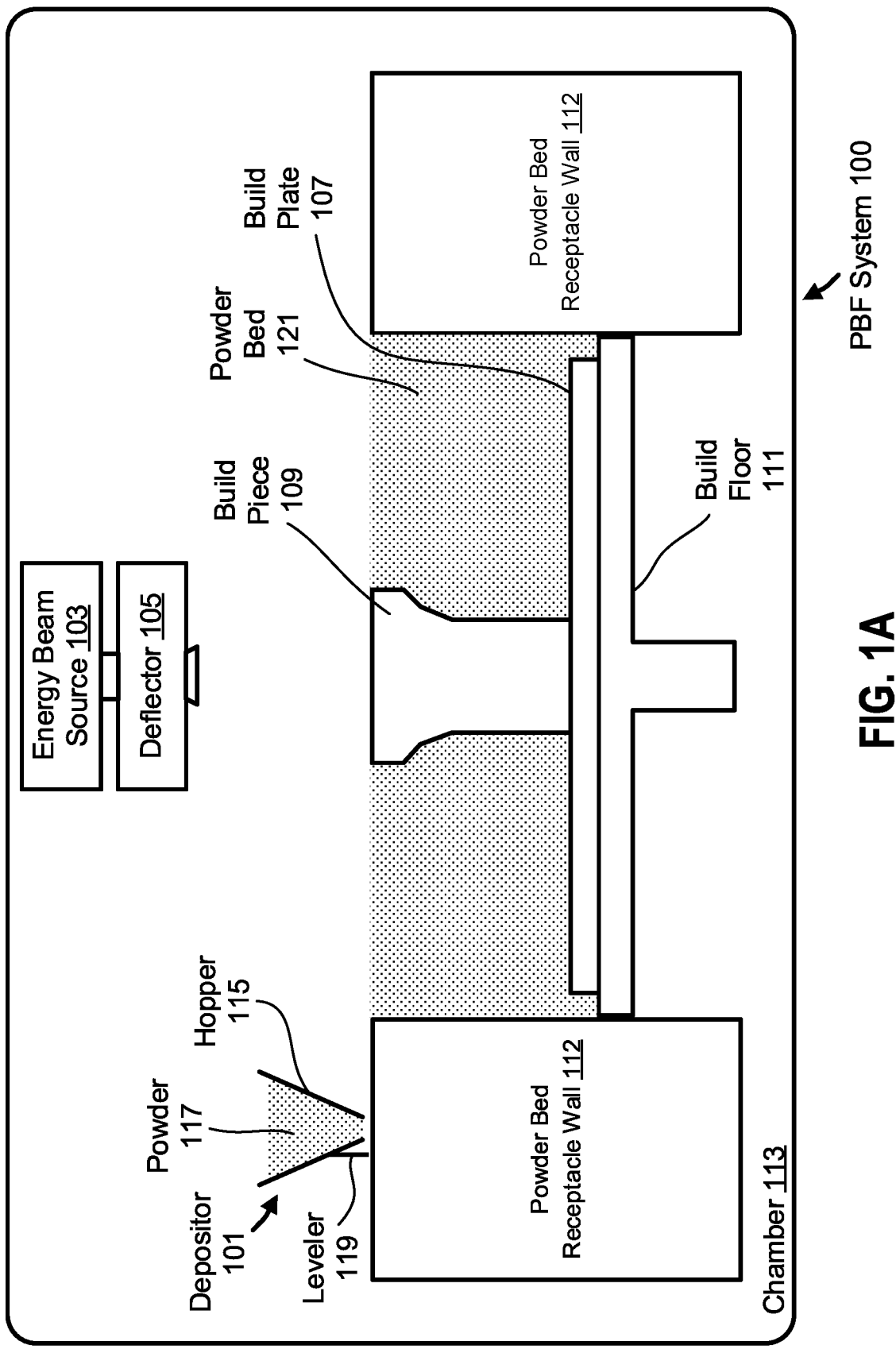
FIGS. 1A-D illustrate respective side views of an exemplary PBF system during different stages of operation.

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

While this disclosure is generally directed to support structures for PBF systems, it will be appreciated that PBF systems may encompass a wide variety of AM techniques. Thus, the PBF process may include, among others, the following printing techniques: Direct metal laser sintering (DMLS), Electron beam melting (EBM), Selective heat sintering (SHS), Selective laser melting (SLM) and Selective laser sintering (SLS). PBF fusing and sintering techniques may further include, for example, solid state sintering, liquid phase sintering, partial melting, full melting, chemical binding and other binding and sintering technologies. Still other PBF processes to which the principles of this disclosure are pertinent include those that are currently contemplated or under commercial development. While the specific details of each such process are omitted to avoid unduly obscuring key concepts of the disclosure, it will be appreciated that the claims are intended to encompass such techniques and related structures.

As discussed above, PBF systems can produce metal and polymer structures (referred to as build pieces) with geometrically complex shapes, including some shapes that are difficult or impossible to create with conventional manufacturing processes. PBF systems create build pieces layer-by-layer, i.e., slice-by-slice. Each slice can be formed by a process of depositing a layer of metal powder and fusing (e.g., melting and cooling) areas of the metal powder layer that coincide with the cross-section of the build piece in the slice. The process can be repeated to form the next slice of the build piece, and so on.

However, the shape of some build pieces can produce undesirable results in the finished piece. For example, some shapes include overhangs, which include portions of the build piece that are formed by melting powder on top of loose powder, i.e., powder that is not fused. A simple example of an overhang includes a common bowl, wherein a portion of the periphery of the bowl may be raised relative to a central portion of the bowl. In the context of AM, the raised portion of the bowl may be subject to the effects of gravity as well as thermal effects associated with temperature changes in the fusing process, which left unattended, may cause the raised portion to sag or otherwise deform.

In this regard, support structures can be used to mitigate or prevent problems associated with overhang areas. Described herein are various systems, apparatuses, and methods for creation of support structures in PBF systems and for removal of support structures from build pieces, as well as various novel configurations of support structures. In the context of AM and associated PBF techniques, support structures may be used to offset or otherwise mitigate the undesirable consequences of overhanging structures prone to deformation or other problems. Various measures may be undertaken to remove the support material from the build piece after the build plate is rendered and solidified. Particularly in the context of complex geometrical structures, such an undertaking may present its own set of challenges.

As discussed in more detail below, some support structures can provide a mechanical link between the support plate (also referred to a build plate) and the build piece, stabilizing structures that are overhung relative to the main structure of the build piece. These types of support structures can be constructed, for example, much like the build piece itself, in that a plurality of layers of powder can be deposited in an area generally beneath and/or partially or fully surrounding an anticipated overhang, with each layer being fused to provide the requisite support for the overhang to be rendered in subsequent passes of the electron beam during ensuing print cycles. More specifically, pools of melted powder (i.e., melt pools) in a designated area can be established adjacent to prior sequential layers of melted and cooled powder, which can then collectively solidify together into a continuous structure. In some cases, this linking can be necessary due to the powder being an easily deformable solid. Because these types of support structures can be formed exclusively from melted powder, these support structures may be beneficial in cases in which it is desirable to prevent contamination of the powder by other materials, for example. Depending on the specific AM technique employed, the methods of forming mechanically linked layers may vary.

In some cases, instead of mechanical linking layers via fusing (e.g., melting and solidification), support structures may be formed by binding the powder. For example, mechanical compaction of the powder can be performed such that the compacted powder is sufficiently less deformable, and fused structures can be formed above the compacted powder. Thus the compacted powder can be described as being bound together. Compaction can be performed using a variety of methods including, for example, mechanical rolling, application of gas pressure, a mechanical press, etc. Because compacted-powder support structures can be formed exclusively of powder, these support structures may also be beneficial in cases in which it is desirable to prevent contamination of the powder by other materials, for example. In addition, support structures formed of compacted powder may be desirable in cases in which powder is recovered from the powder bed and reused because the compacted powder may be easily recyclable. In addition, compacted-powder support structures can be easy to remove from build pieces, thus reducing the time and energy required to remove support structures and reducing the risk of damage to the build piece. In some cases, techniques using low levels of sintering can be performed to thermally heat and sinter the compacted area, which may provide a more stable support structure than mere compaction.

In some exemplary embodiments, a binding agent can be deposited in areas of powder to create a support structure. In some cases, the binding agent may be thermally crosslinked by energy beam heating. This binding agent can be placed by a print head that tracks across the powder bed behind the depositor, for example, depositing binding agent in regions under overhang areas of the build piece. Likewise, a binding agent can include a fluid or gel that can be deposited such that the powder is held to a sufficiently large degree to support the build piece (e.g., similar to wet sand being more bound together than dry sand). In some cases, the binding agent can include an adhesive agent, such as a resin.

In some exemplary embodiments described further below, the techniques of creating support structures by fusing, compacting, sintering, applying a binder, or other techniques described herein can be used to create support structures that can provide support by 'floating' the build piece above uncompacted powder. Creation of 'floating' support structures can allow less powder to be used to form the support structures, which may reduce build time, allow more powder to be recovered and reused, etc.

In other exemplary embodiments, support structures can be formed from materials other than the powder. For example, a support material, such as a dense foam, can be deposited in an area devoid of powder, and the deposited support material can form a support structure. In some cases, the support material may be deposited in a layer prior to, or concurrently with, the deposition of the layer of powder. For example, a separate support material depositor mechanism (e.g., a separate or dedicated print head, automated constructor, computer-controlled robotic arm, etc.) can pass over the work area and deposit a layer of support material in the desired areas, then the powder depositor can pass over the work area and deposit the layer of powder in the remaining areas. In another example, an integrated print head may be capable of depositing either powder or support material as it passes over the work area, thus depositing specific material in specific locations.

In some examples, the powder depositor may deposit a layer of powder, and then a vacuum in the build chamber may remove powder from undesired areas. The newly-empty areas can then be filled with support material, such as foam or another space keeper. For example, the foam may be injected or placed as bricks/plates of a thickness configured to substantially conform to the thickness of the layer. While layer thickness may vary widely depending on the AM technique deployed, AM capabilities, etc. in one embodiment using selective layer sintering (SLS) the layer thickness ranges from approximately 0.060 mm to 0.150 mm In some cases, the support material can be deposited at a height greater than the height of the layer. For example, the entire support structure may be deposited at once at the beginning of the build. In this case, the powder depositor can be configured to deposit powder only in areas without support structures such that the depositor avoids the portions of the support structures above the layer currently being rendered. For example, the wiping/leveling system of the depositor can be configured to miss any areas that are built up with support material, until it is determined that the powder layer is at a level that is substantially even with or covers the support material.

In various embodiments, the support material can remain in the final part, or be dissolved away, for example.

Various exemplary embodiments disclosed herein are directed to novel configurations of support structures. In some embodiments, support structures can be configured to include resonant structures. Vibration of resonant support structures at its natural frequency may be sufficient to cause the support structure to break away from the 3-D build piece and/or the build plate, or, for instance, to substantially loosen the bond for a subsequent maneuver requiring less force. This breakage can be caused, for example, by the increased amplitude of the resonant oscillations of the applicable portion of the support structure inducing metal fatigue at the interface between the support structure and the build piece and/or build plate. Support structures can include a main body that contains an extrusion of fixed length, width and taper. The tapered ends of the extrusions can be connected to the 3-D build piece, the substrate plate, and/or to the support framework. In some cases, resonant support structures can include half-wave resonators, quarter-wave resonators, etc., which may allow metal fatigue to be induced more effectively.

After this stage of the AM operation is completed and the loose powders are removed, an excitation resonant frequency can be applied via mechanical conduction directly or indirectly through a medium to the build piece, the support structure, the build plate, etc. Mechanical excitation can be generated, for example, by ultrasound transducers, piezoelectric transducers, micro electro-mechanical systems, etc. The transducer can be attached to the build piece, the support structure, the build plate, or another suitable location for enabling the relevant portion of the support structure to receive the mechanical input. As noted above, the induced vibration can cause the support structure to vibrate with increasing amplitude until the ends break off from the build piece and the build plate.

In various embodiments, further control of the support structure break-off can be achieved by a variant adaptation of this design with multiple resonant nodes. For instance, support extrusions of different lengths, widths, and/or tapers may be applied to different areas of the build piece. This can allow for the selective removal of supports by applying different excitation frequencies. A medium could also be used for complete or partial immersion of the build piece to speed the break-off process. Sound waves and heating may also be used to drive the break-off process.

In various embodiments, electric current can be used to remove the supports. For example, the support structure can be formed such that an interface (e.g., contact points) between the support structure and the build piece can heat substantially when an electrical current is applied. For example, the contact points can be tapered such that the contact points provide a relatively high electrical resistance compared to the remaining portions of the support structure and build piece. An electrical current can be applied across the tapered contact points to heat and melt the contact points to remove the support structure from the build piece.

FIGS. 1A-D illustrate respective side views of an exemplary PBF system 100 during different stages of operation. As noted above, the particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 112 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
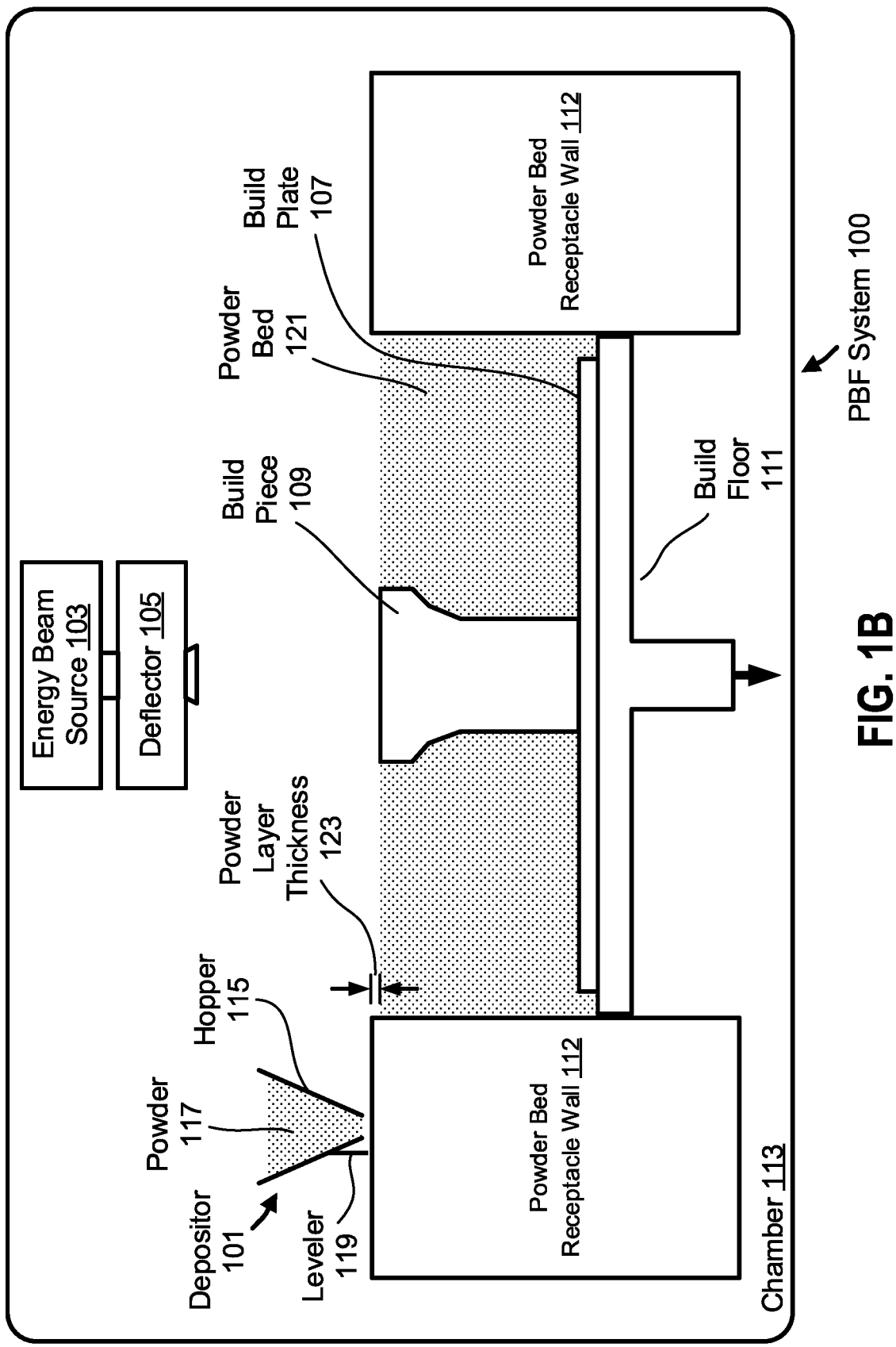

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
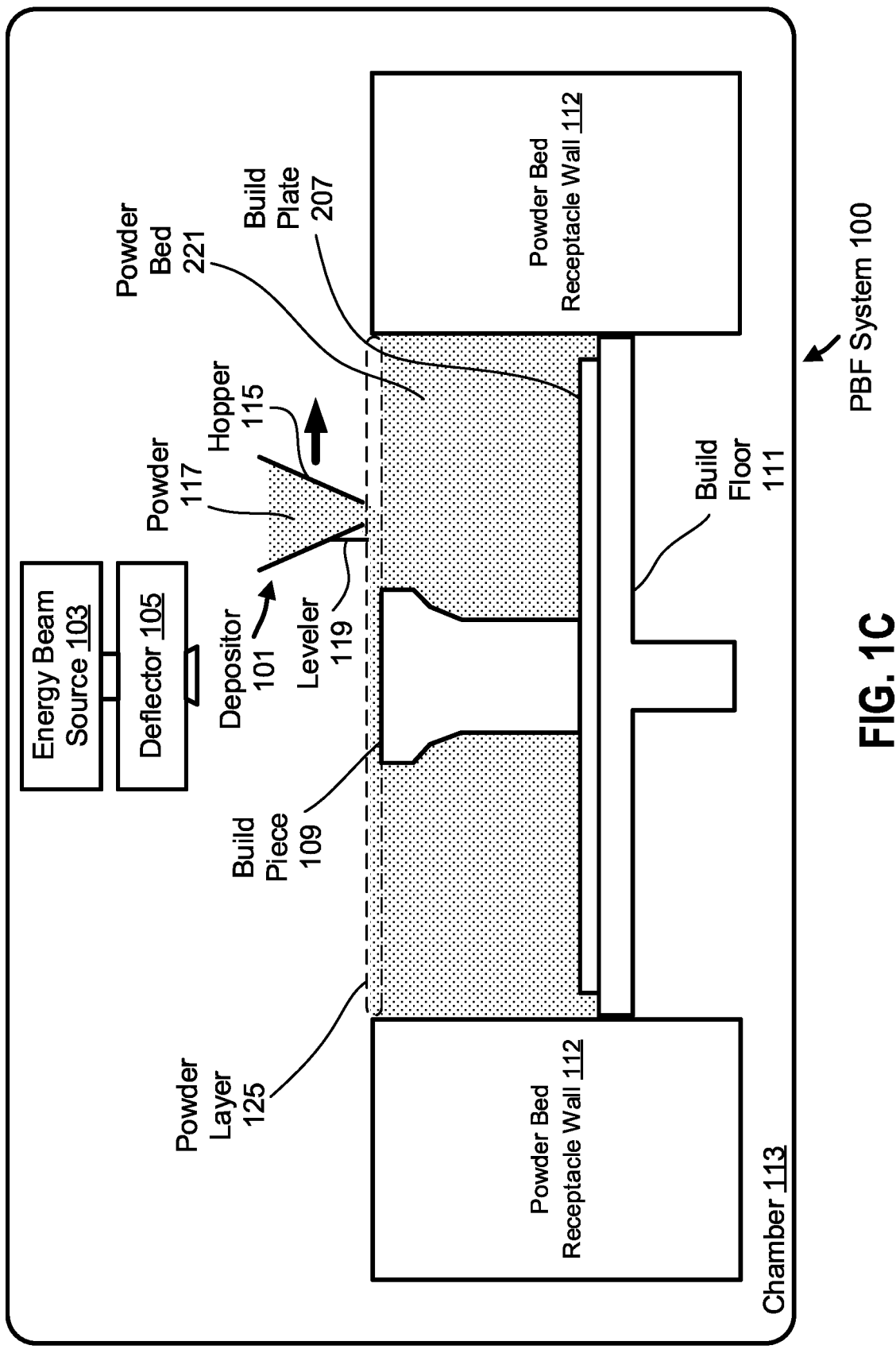

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness of substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving 150 previously-deposited layers discussed above with reference to FIG. 1A.

Figure 1D:
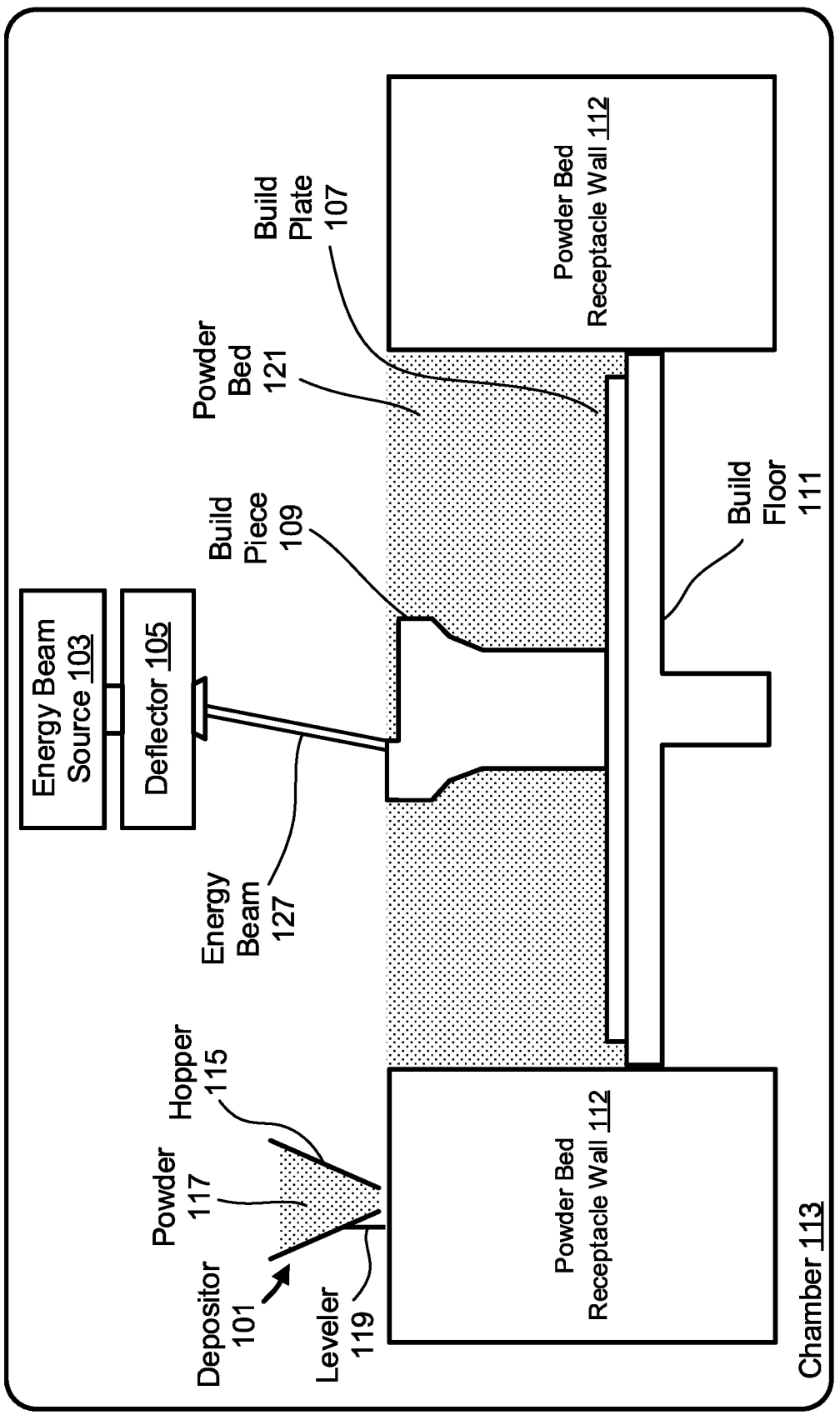

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

As shown in FIG. 1D, much of the fusing of powder layer 125 occurs in areas of the powder layer that are on top of the previous slice, i.e., previously-fused powder. An example of such an area is the surface of build piece 109. The fusing of the powder layer in FIG. 1D is occurring over the previously fused layers characterizing the substance of build piece 109. However, in some areas of powder layer 125, fusing can occur on top of loose powder—namely, over powder that was not fused-inadvertently or otherwise. For example, if the slice area is bigger than the previous slice area, at least some of the slice area will be formed over loose powder. Applying the energy beam to melt an area of powder over loose powder can be problematic. Melted powder is liquefied and generally denser than loose powder. The melted powder can seep down into the loose powder causing drooping, curling, or other unwanted deformations in the build piece 109. Because loose powder can have low thermal conductivity, higher temperatures than expected can result when fusing powder in overhang areas because the low thermal conductivity can reduce the ability for heat energy to conduct away from the fused powder during fusing. Higher temperatures in these areas result in higher residual stresses after cooling and, more often than not, a poor quality build piece. In some cases, dross formations can occur in overhang areas thereby resulting in undesired surface roughness or other quality problems.

Figure 2:
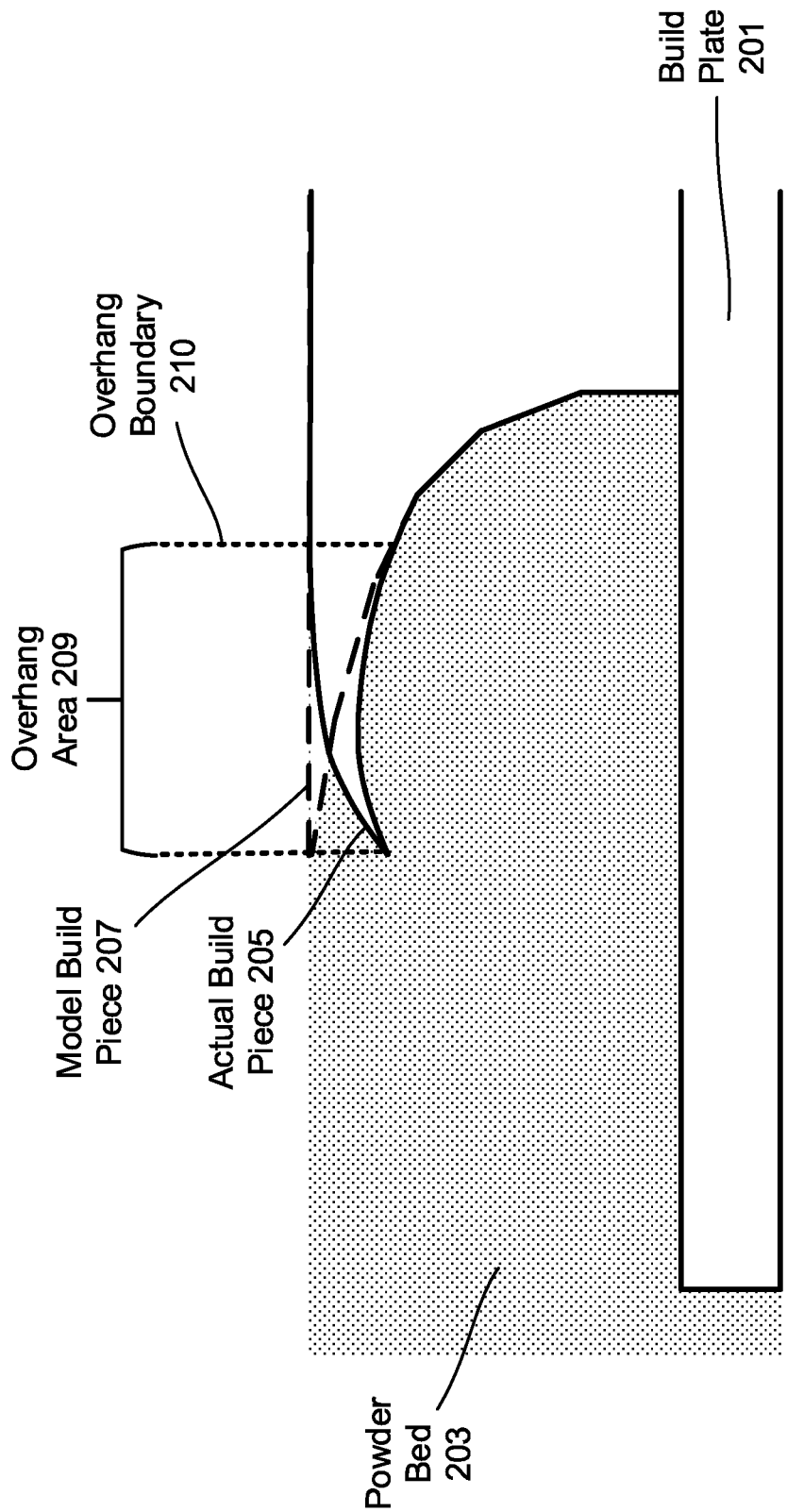
FIG. 2 illustrates an exemplary drooping deformation in a PBF system.

FIG. 2 illustrates a side view of an exemplary drooping deformation in a PBF system that can result in overhang areas. FIG. 2 shows a build plate 201 and a powder bed 203. In powder bed 203 is an actual build piece 205. A model build piece 207 is illustrated by a dashed line for the purpose of comparison. In one embodiment, model build piece 207 includes data from the data model created in CAD for use as an input to the AM processor to render the build piece. Model build piece 207 shows the desired shape of the build piece. Actual build piece 205 overlaps model build piece 207 in most places, i.e., in places that have no deformation. Thus, in areas to the right of overhang boundary 210, the solid line characterizing the actual build piece 205 overlaps with the dashed line defined in the model build piece 207. However, a drooping deformation occurs in an overhang area 209. In this example, overhang area 209 is formed from multiple slices fused on top of one another. In this case, the deformation worsens as overhang area 209 extends from the bulk of actual build piece 205. As the actual build piece 205 in FIG. 2 illustrates, some build piece shapes can therefore require the use of support structures in order to mitigate or prevent deformations and other problems that can result in overhang areas.

It should be noted that some problems, such as deformations, higher residual stresses, etc., can occur in areas in which powder in one layer is fused near the edge of the slice in the layer below, even though the fusing does not occur directly over loose powder. For example, unexpectedly high temperatures can result when fusing powder near the edge of a slice below because there is less fused material below to conduct heat away. These problems can be particularly severe where the slices below form a sharp edge. In this regard, support structures may be used to mitigate or prevent deformations and other problems that can result in these areas near overhang areas as well. As used herein, the terms "overhang area" and the like are intended to include areas near overhang areas and over fused powder, such as described above in areas adjacent the fusing of powder near the edge of a slice below, in areas where slices form sharp corners or edges, and similar areas that can potentially result in the above-described array of unwanted overhang artifacts in the subject build piece.

FIGS. 3, 4A-C, and 5-10 illustrate example systems, methods, and configurations for bound powder support structures, in which particles of loose powder can be bound (e.g., with a binding agent, by compacting the loose powder, etc.) to provide a support structure. FIGS. 11A-C, 12A-C, 13, 14A-B, and 15 illustrate example systems and methods for support structures using materials other than powder, for example, a foam that can be deposited in areas void of powder, pre-formed support structures that can be positioned before powder is deposited, etc. FIGS. 16-25 illustrate example configurations for fused powder support structures and example systems and methods for removal of support structures.

Figure 3:
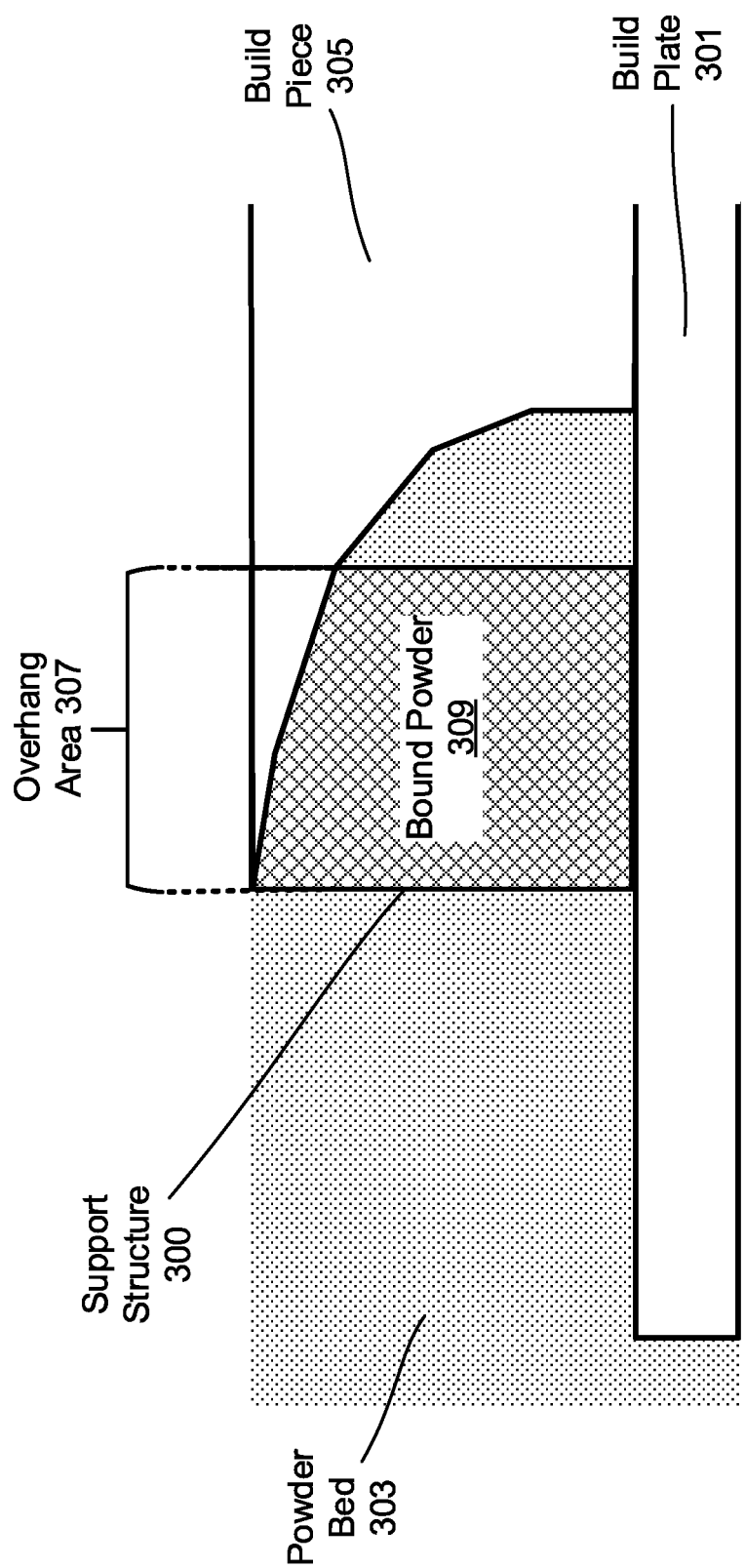
FIG. 3 illustrates an exemplary embodiment of a bound-powder support structure.

FIG. 3 illustrates a side view of an exemplary embodiment of a bound-powder support structure 300. FIG. 3 shows a build plate 301 and a powder bed 303. In powder bed 303 is a build piece 305 that includes an overhang area 307. In powder bed 303, under the portion of build piece 305 in overhang area 307, there is a region of bound powder 309. As described above, bound powder can be, for example, compacted powder, partially sintered powder, powder with a binding agent applied, etc. Bound powder 309 can form support structure 300 that supports the portion of build piece 305 in overhang area 307. In this way, for example, support structure 311 formed of bound powder 309 mitigates or prevents deformations and other unwanted artifacts of build piece 305.

Bound powder can be formed in various ways. In various embodiments, bound powder can be formed by compacting loose powder by, for example applying pressure on the surface of the loose powder. In this way, loose powder can be compacted, or bound, together. Because compacted powder has a greater density than that of loose powder, it is not surprising that compacted powder represents an improvement as a support mechanism for overhanging build pieces.

In various embodiments, compacted powder can be sintered to further increase the binding of the powder. Additionally, a binding agent can be applied to bind loose powder. For example, a liquid or gel may be applied to increase the cohesiveness of loose powder. In some examples, the binding agent can include an adhesive to further increase the cohesiveness.

Figure 4A:
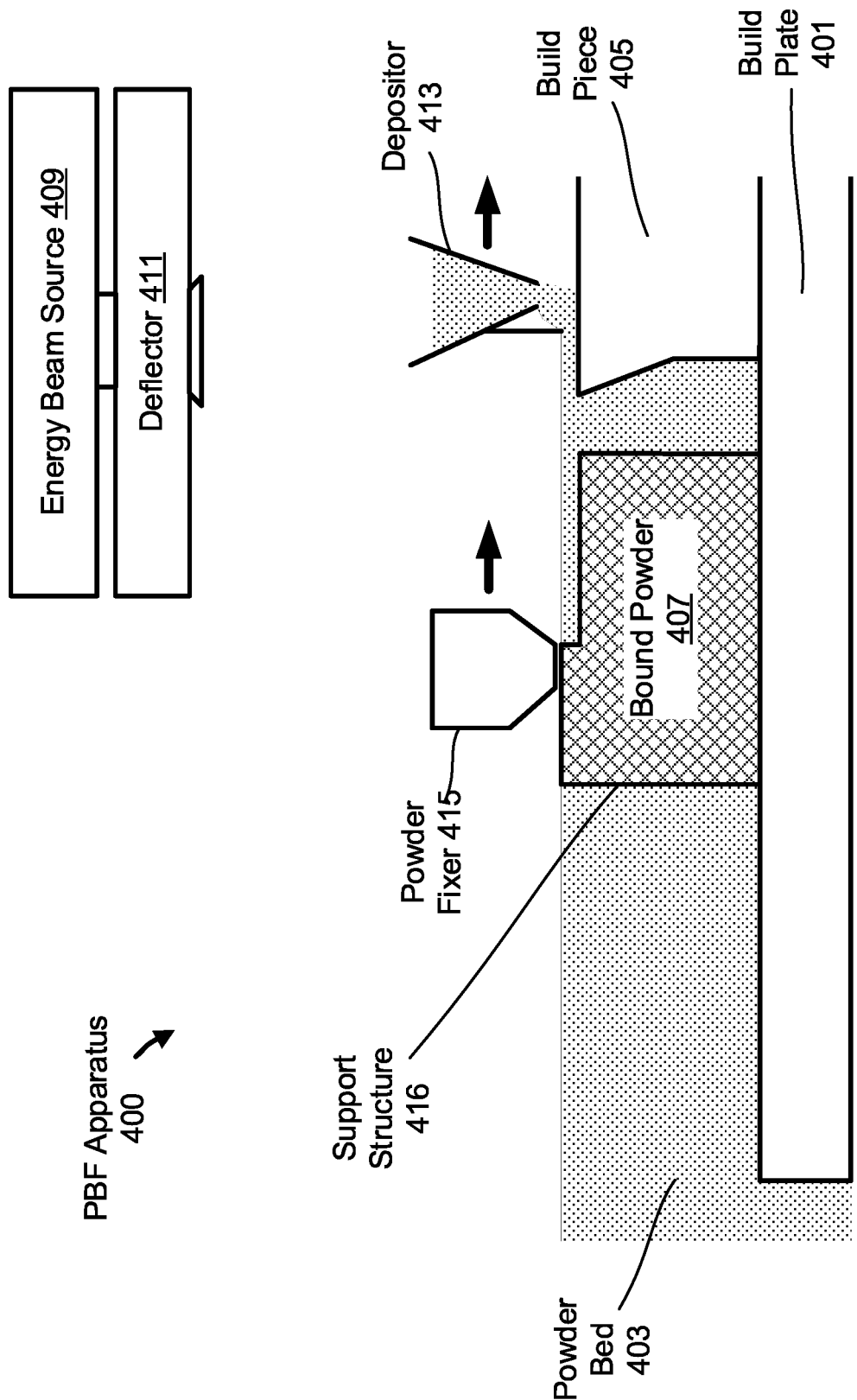
FIGS. 4A-C illustrate an exemplary embodiment of a PBF apparatus for forming a support structure of bound powder.
Figure 4B:
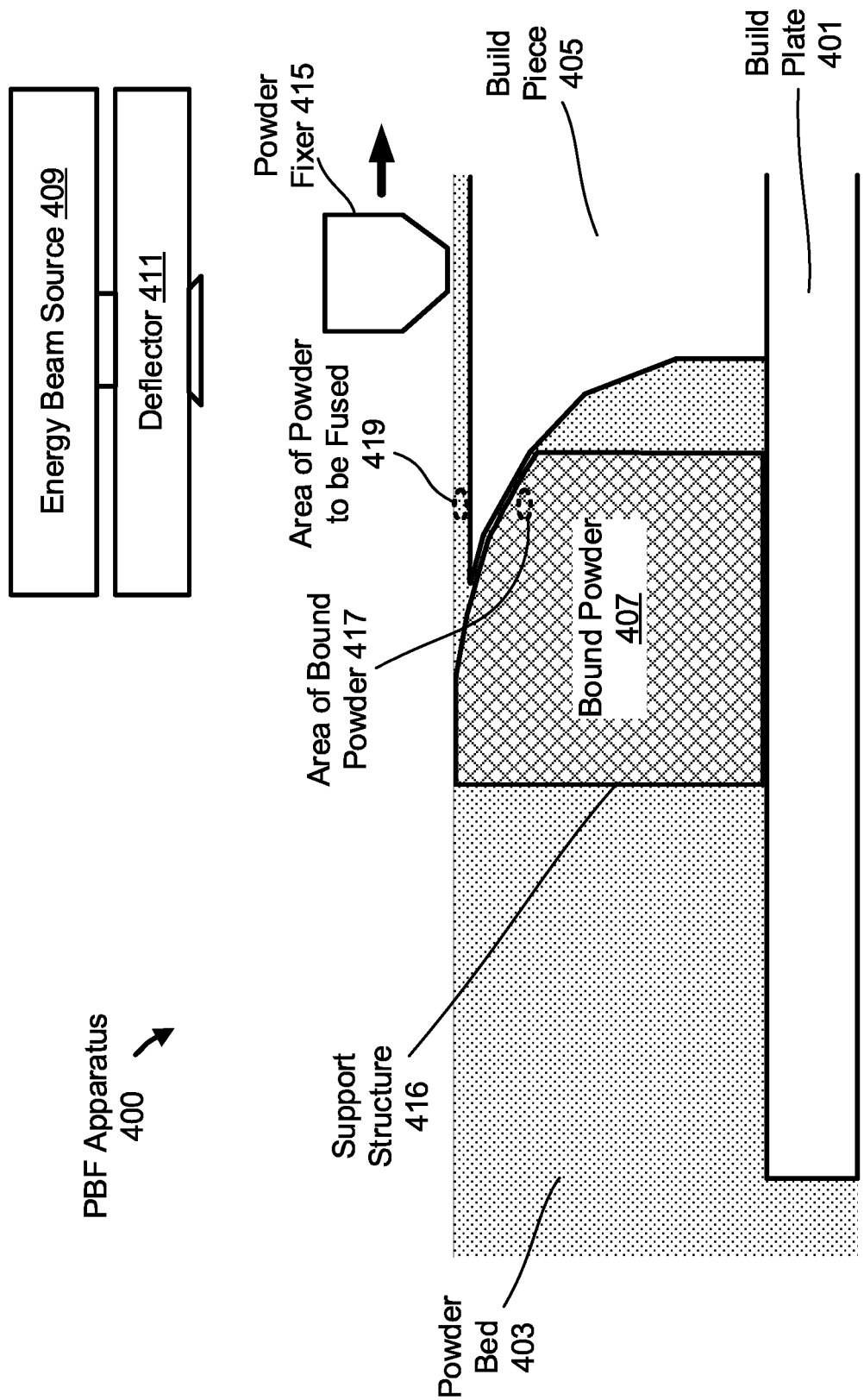
Figure 4C:
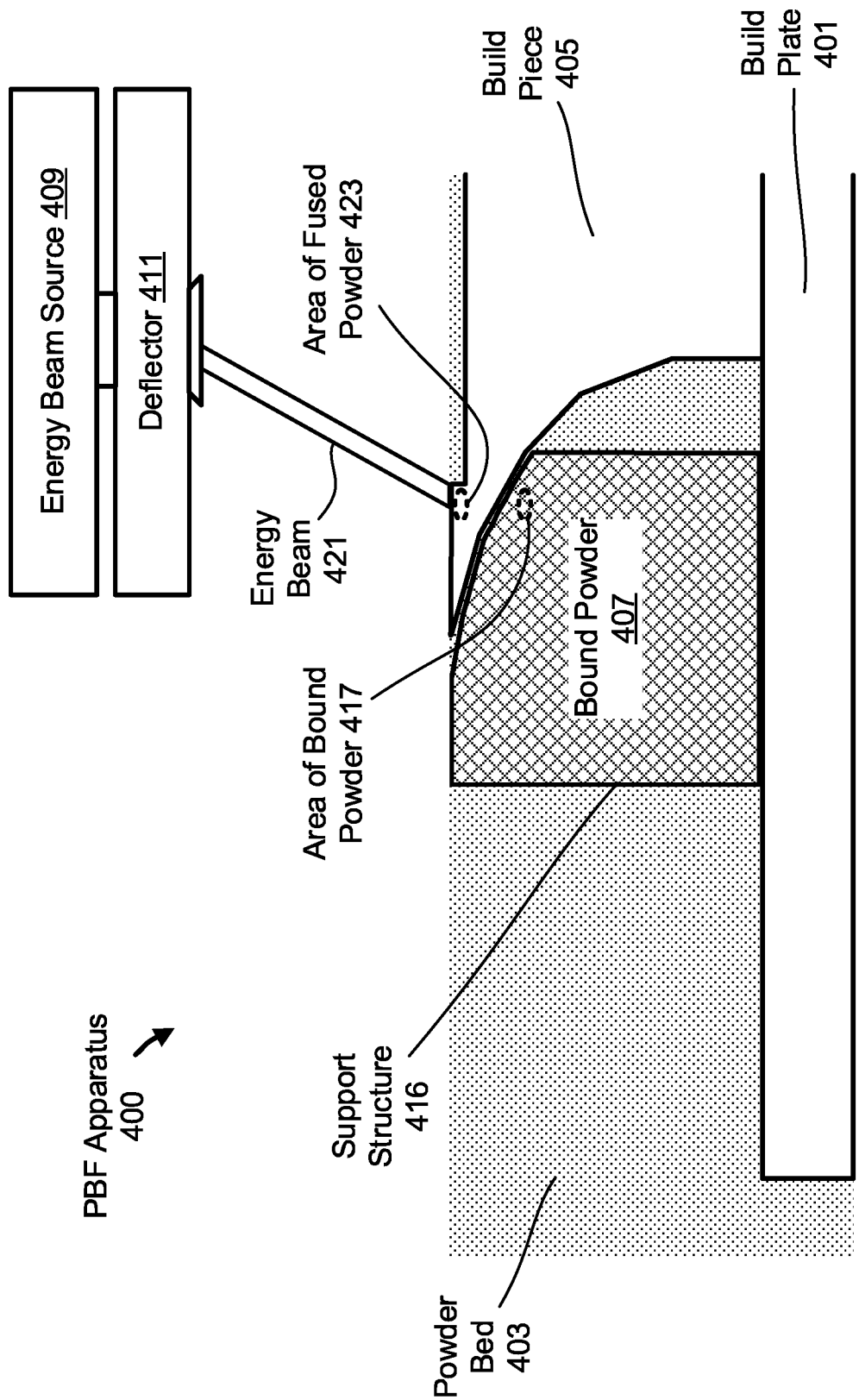

FIGS. 4A-C illustrate respective side views of an exemplary embodiment of a PBF apparatus 400 for forming a support structure of bound powder, such as support structure 300 (FIG. 3). FIGS. 4A-C show a build plate 401 and a powder bed 403. In powder bed 403 is a build piece 405 and bound powder 407. PBF apparatus 400 can include an energy beam source 409, a deflector 411, and a depositor 413. PBF apparatus 400 can also include a powder fixer 415.

FIG. 4A shows an example operation of PBF apparatus 400 to form bound powder 407 within a work area generally characterized by powder bed 403. Depositor 413 can move across the work area to deposit a layer of powder. Powder fixer 415 can move across the work area following depositor 413 (see the bolded arrows designated rightward motion of the components) and bind powder in an area of the layer deposited by the depositor to create bound powder 407, which can form a support structure 416. In this regard, bound powder 407 can be built up in slices similar to the fusing of slices to form build piece 405, except that instead of fusing the powder, powder fixer 415 binds the powder. In various embodiments, powder fixer 415 can bind the powder by, for example, compacting the powder, sintering the compacted powder, applying a binding agent to the powder, and related techniques, as will be discussed in further detail below.

FIG. 4B shows a state of PBF apparatus 400 after bound powder 407 has been formed under an overhang area of build piece 405. FIG. 4B shows a state in which powder fixer 415 has moved across the work area and has finished binding bound powder 407 in the current layer. As can be seen in FIG. 4B, there is an area of bound powder 417 underneath an area of powder to be fused 419.

FIG. 4C shows a state of PBF apparatus 400 in which a layer of powder is being fused. Energy beam source 409 creates an energy beam 421, and deflector 411 applies the energy beam to an area of powder deposited by depositor 413. In this regard, energy beam 421 is applied to area of powder to be fused 419 to create an area of fused powder 423. Area of fused powder 423 is above area of bound powder 417. As is evident from the shape of build piece 405, the problems associated with drooping, gravity, temperature fluctuations and other anomalies are substantially eliminated by virtue of support structure 416 enclosing bound powder 407.

Figure 5:
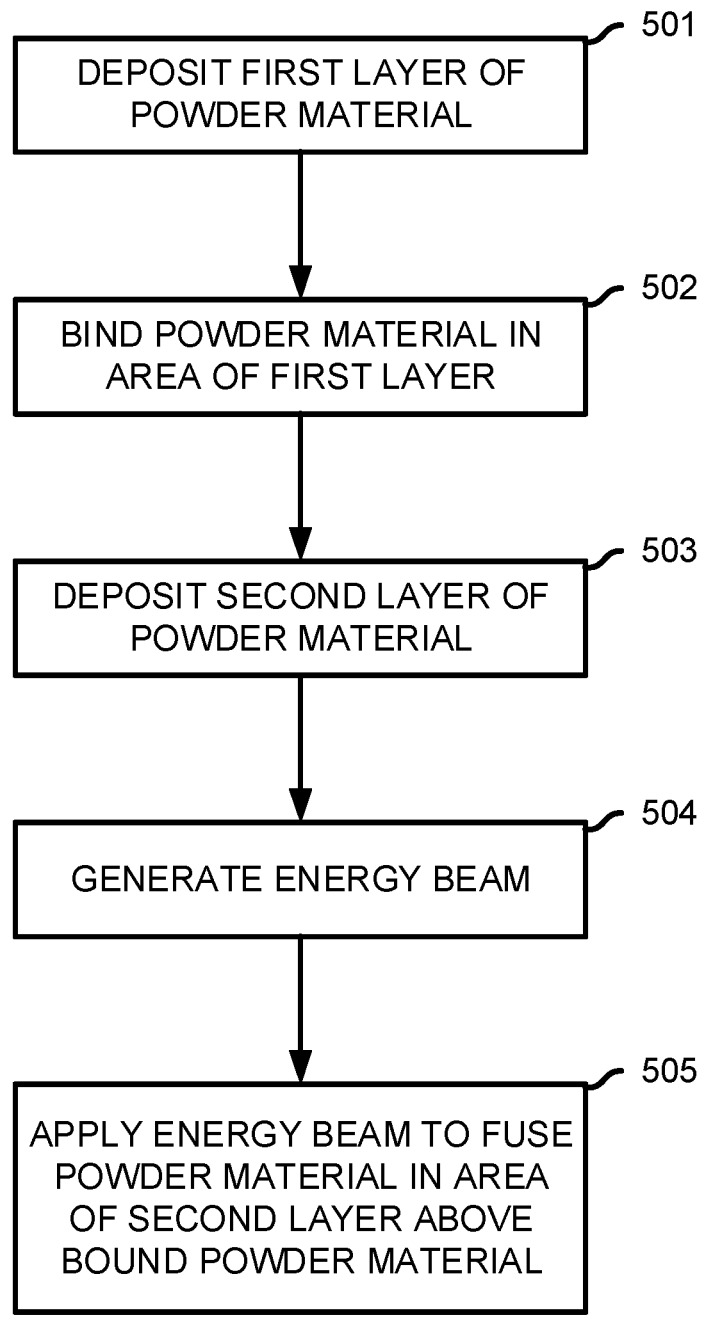
FIG. 5 is a flowchart of an exemplary embodiment of a method of creating support structures of bound powder in a PBF apparatus.

FIG. 5 is a flowchart of an exemplary embodiment of a method of creating support structures of bound powder in a PBF apparatus. A PBF apparatus can deposit (501) a first layer of powder material and can bind (502) powder material in an area of the first layer. The PBF apparatus can deposit (503) a second layer of powder material above the first layer. The PBF apparatus can generate (504) an energy beam and can apply (505) the energy beam to fuse powder material in an area of the second layer above the bound powder material in the first layer. For example, in FIG. 4C, energy beam 421 is applied to the layer of powder to fuse area of fused powder 423, which is over area of bound powder 417.

Figure 6:
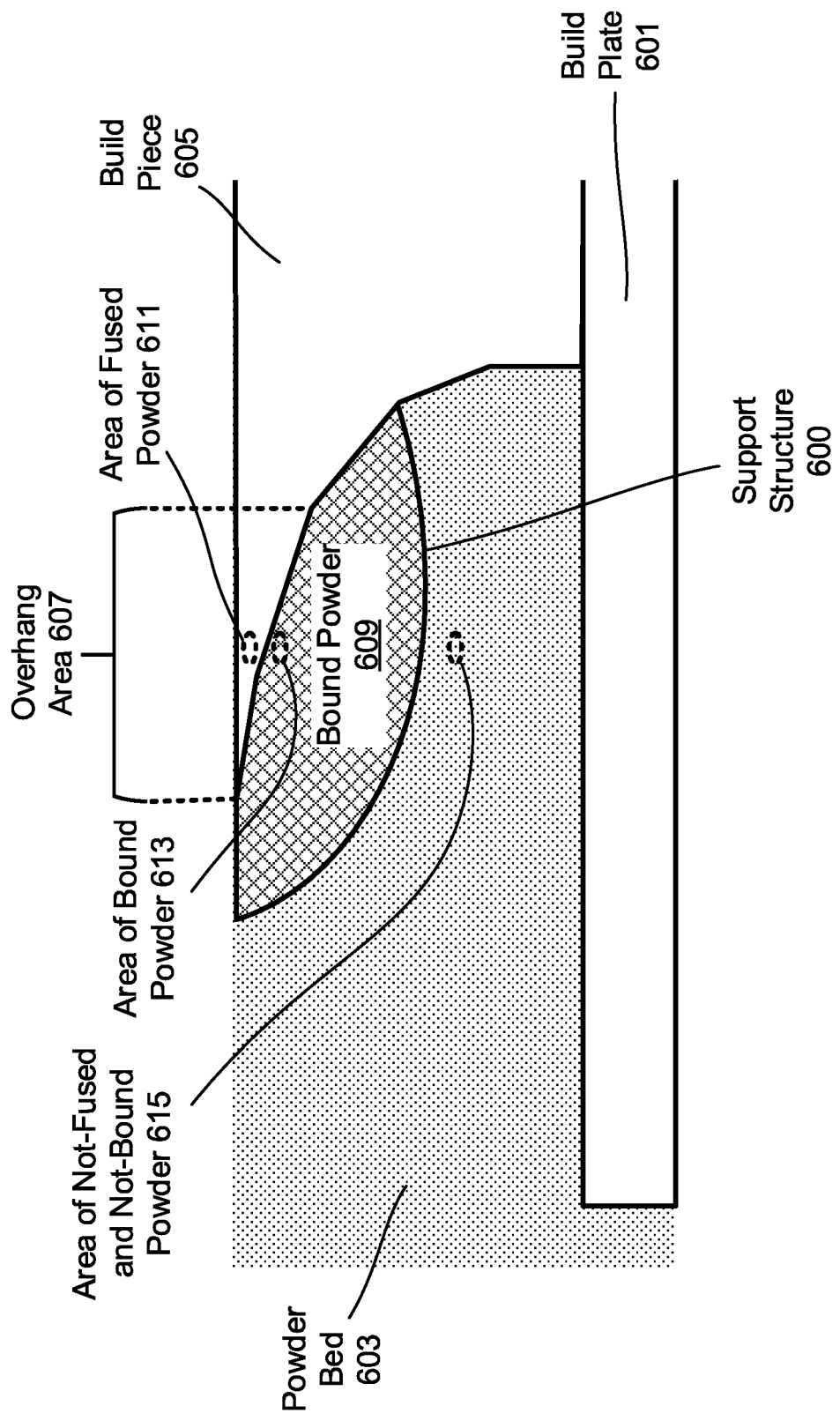
FIG. 6 illustrates an exemplary embodiment of a configuration of a support structure.

FIG. 6 illustrates a side view of an exemplary embodiment of a configuration of a support structure 600 in an overhang area 607 of powder bed 603. FIG. 6 shows a build plate 601, the powder bed 603, and a build piece 605. A portion of build piece 605 can be in an overhang area 607. In this example, support structure 600 can be formed of a region of bound powder 609. In this configuration, support structure 600 does not extend down to build plate 601. Furthermore, in this configuration support structure 600 does not form an attachment to build piece 605 (in contrast to other exemplary embodiments, e.g., FIG. 16 described below, in which the support structure is attached, or 'anchored,' to a portion of the build piece that is not in an overhang area). Thus, support structure 600 is supported solely by loose powder. However, support structure 600 can support build piece 605 because, as discussed above, the support structure can 'float' on loose powder in powder bed 603. More specifically, bound powder 609 can be formed to cover wider area than overhang area 607, such that deformation forces in the downward direction acting on build piece 605 can be distributed to a greater area of loose powder. In this way, the force can be distributed in such a way that the loose powder underneath support structure 600 can provide an adequately non-deformable link between the support structure 600 and build plate 601. Therefore, support structure 600 can effectively support portions of build piece 605 in overhang area 607 even though the support structure does not extend all of the way to build plate 601. In the configuration of FIG. 6, for example, an area of fused powder 611 is above an area of bound powder 613, which is above an area of not-fused and not-bound powder 615.

Support structures that are supported solely by loose powder can be referred to as floating support structures. It should be noted that floating support structures such as the example shown in FIG. 6 can be formed using various techniques, e.g., formed using bound powder techniques such as compacting, compacting and sintering, applying a binder, etc., and/or formed using non-powder support materials (described in more detail below). Floating support structures can allow less powder to be used to form the support structures, which among other benefits, reduces build time and allows more powder to be recovered and reused. These factors collectively result in cost savings, manufacturing efficiency, and potential time to market advantages.

In addition, floating support structures may allow additional build pieces to be built more efficiently during a single PBF AM run. For example, additional build pieces may be built in the spaces of loose powder below anchored support structures, i.e., in the spaces in which other support structures would ordinarily extend through to reach down to the build plate. In another exemplary embodiment involving a bound powder region 609 having a comparatively large area 613, a second adjacent component (not shown) may be constructed adjacent build piece 605 using an opposite side of bound powder region 609 as a support structure for overhang support. These exemplary embodiments potentially allow for a much greater ability to render more types of build pieces in a comparatively shorter time.

Figure 7:
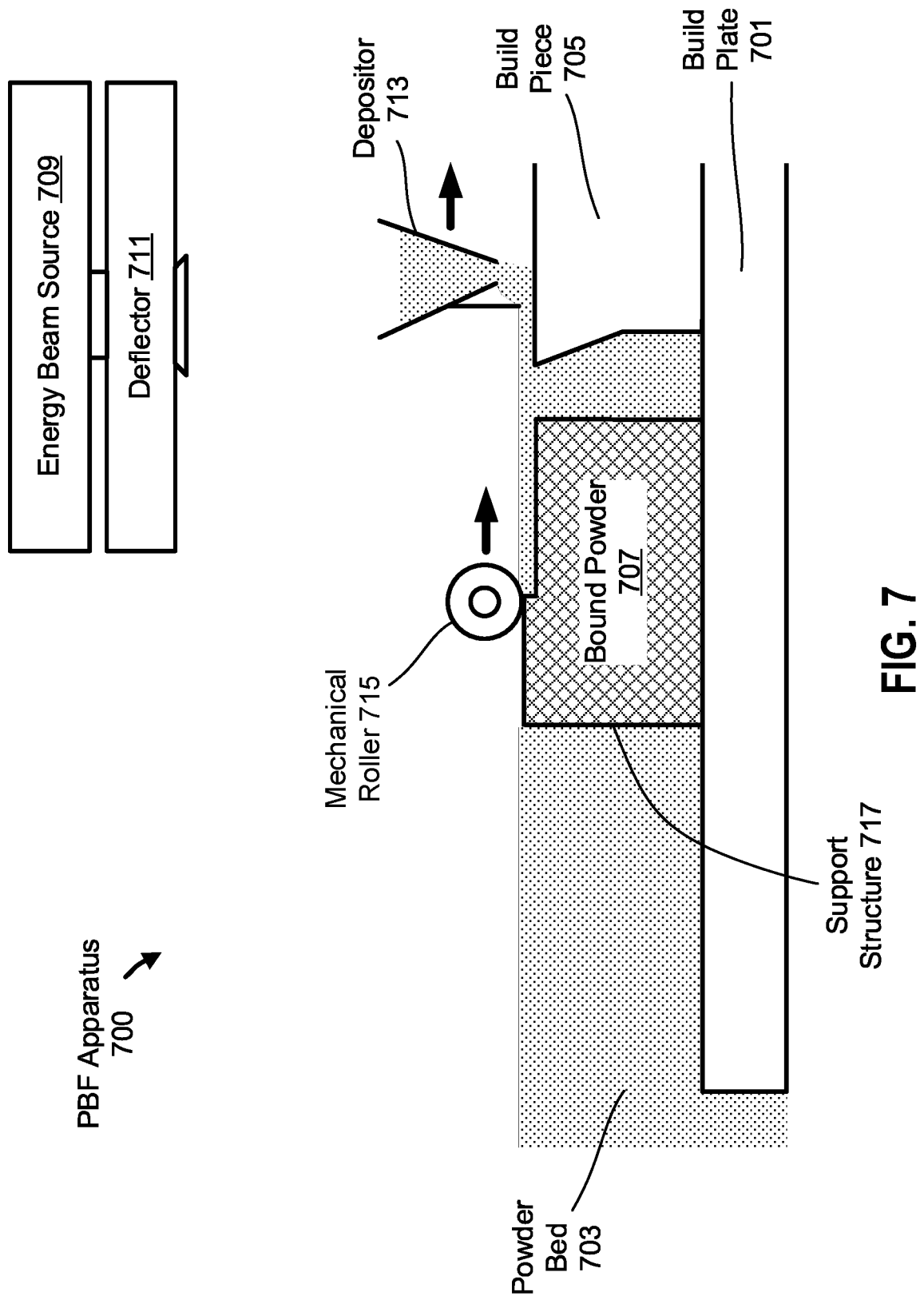
FIG. 7 illustrates an exemplary embodiment of a PBF apparatus and method for compacting the powder with a mechanical roller.
Figure 8:
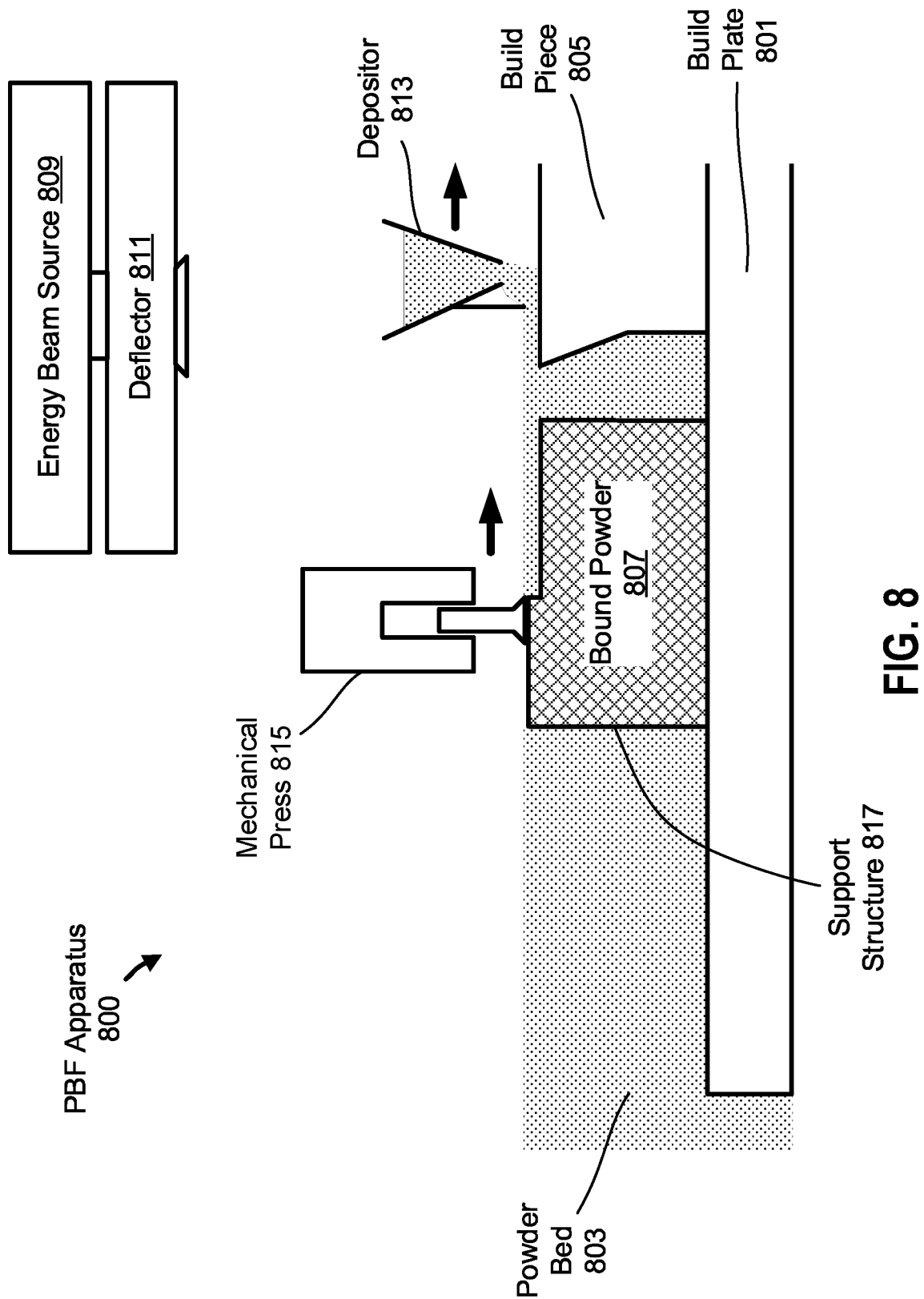
FIG. 8 illustrates an exemplary embodiment of a PBF apparatus and method for compacting powder with a mechanical press.

FIGS. 7 and 8 are side views illustrating exemplary embodiments of PBF systems and methods for bound-powder support structures in which binding the powder includes compacting the powder. These types of support structures can be referred to as compacted-powder support structures. For example, mechanical compaction of the powder can be performed such that the compacted powder is sufficiently less deformable, and fused structures can be formed above the compacted powder. Thus the compacted powder is effectively bound together. Because compacted-powder support structures can be formed exclusively of powder, these support structures may also be beneficial in cases in which it is desirable to prevent contamination of the powder by other materials, for example. In addition, support structures formed of compacted powder may be desirable in cases in which powder is recovered from the powder bed and reused because the compacted powder may be easily recovered and reused. Further, compacted-powder support structures are comparatively easier to remove from build pieces, thus reducing the time and energy required to remove support structures. These benefits may likewise result in reduced cost and increased efficiency and capacity on the factory floor.

It should be noted that by compacting the powder, the top surface of the compacted powder may be lower than the top surface of the non-compacted powder in the layer. However, in various embodiments, the next layer of powder deposited by the powder depositor can fill in the extra space such that the top surface of the next powder layer is level (see, e.g., bound powder 707 compared with powder bed 73 in FIG. 7). In this case, the level of the top surface of a support structure formed of compacted powder may not differ from the level of the top surface of the powder bed by more than a small amount.

FIG. 7 illustrates an exemplary embodiment of a PBF apparatus 700 and method in which binding the powder includes compacting the powder with a mechanical roller. FIG. 7 shows a build plate 701 and a powder bed 703. In powder bed 703 is a build piece 705 and bound powder 707.

PBF apparatus 700 can include an energy beam source 709, a deflector 711, and a depositor 713. PBF apparatus 700 can also include a mechanical roller 715 that can operate as a powder fixer, such as powder fixer 415 (see FIGS. 4A-B), by compacting the powder.

Depositor 713 can move across the work area to deposit a layer of powder. Mechanical roller 715 can move across the work area following depositor 713 in sequence with depositor 713 (see rightmost arrows). To this end, mechanical roller 715 can be lowered in an area of the layer deposited by the depositor 713 to roll over the area, thus compacting the powder in the area to create bound powder 707, which can form a support structure 717. In this regard, bound powder 707 can be built up in slices similar to the fusing of slices to form build piece 705, except that instead of fusing the powder, mechanical roller 715 compacts the powder.

FIG. 8 illustrates an exemplary embodiment of a PBF apparatus 800 and method in which binding the powder includes compacting the powder with a mechanical press. FIG. 8 shows a build plate 801 and a powder bed 803. In powder bed 803 is a build piece 805 and bound powder 807. PBF apparatus 800 can include an energy beam source 809, a deflector 811, and a depositor 813. PBF apparatus 800 can also include a mechanical press 815 that can operate as a powder fixer, such as powder fixer 415 (see FIGS. 4A-B), by compacting the powder.

Depositor 813 can move across the work area to deposit a layer of powder. Likewise, mechanical press 815 can move across the work area following depositor 813 (as designated by the bolded arrow). In some instances depending on the input requirements to the AM device as determined, e.g., by the code received from the slicer program, mechanical press 815 may be lock step with depositor 813 except for its variations in vertical motion and can be lowered in an area of the layer deposited by the depositor to apply pressure on the area, thus compacting the powder in the area to create bound powder 807, which in turn can form a support structure 817. In this regard, bound powder 807 can be built up in slices similar to the fusing of slices to form build piece 805, except that instead of fusing the powder, mechanical press 815 compacts the powder.

In various embodiments, compaction can be performed by any method for applying pressure to the powder bed, for example, a nozzle blowing gas, an expanding balloon membrane, and a variety of chemical reactions, among other techniques.

Figure 9:
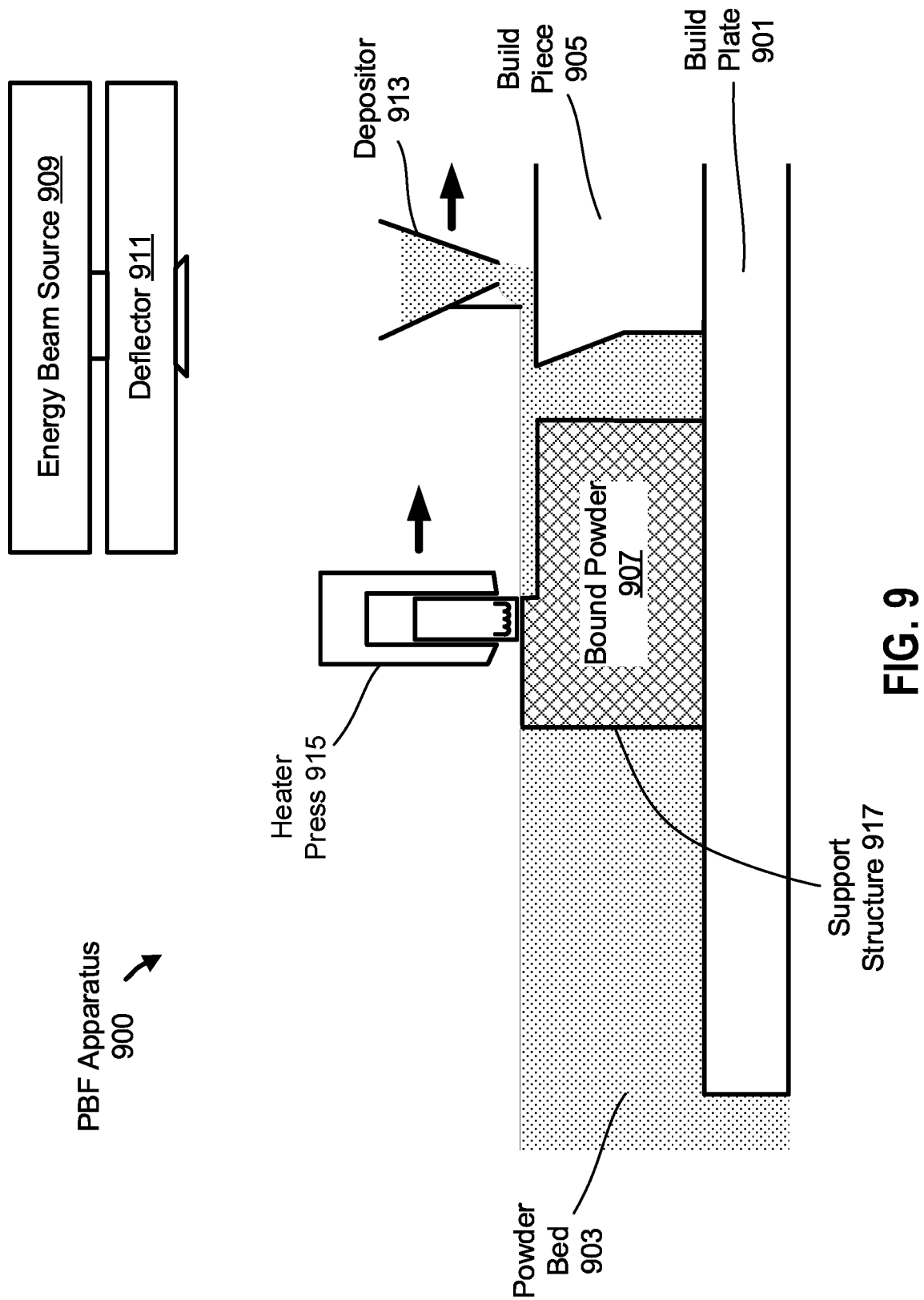
FIG. 9 illustrates an exemplary embodiment of a PBF apparatus and method for sintering compacted powder.

FIG. 9 illustrates a side view of an exemplary embodiment of a PBF apparatus 900 and method in which binding the powder further includes sintering compacted powder with a heater. FIG. 9 shows a build plate 901 and a powder bed 903. In powder bed 903 is a build piece 905 and bound powder 907. PBF apparatus 900 can include an energy beam source 909, a deflector 911, and a depositor 913. PBF apparatus 900 can also include a heater press 915 that can operate to compact the powder and to further bind compacted powder by sintering the compacted powder. Although the example of FIG. 9 shows an integrated heater and press, it should be understood that a separate heater could be used to sinter powder that has been previously compacted by methods such as those described above with reference to FIGS. 7 and 8, for example.

Depositor 913 can move across the work area to deposit a layer of powder. Heater press 915 can move across the work area following depositor 913, as shown in prior embodiments and conceptually illustrated by the arrows, and can be lowered in an area of the layer deposited by the depositor to apply pressure on the area, thus compacting the powder in the area, and to heat the area of compacted powder to sinter the compacted powder, to create bound powder 907, which can form a support structure 917.

In some cases, techniques using low levels of sintering can be performed to thermally heat and sinter the compacted area. While this configuration may provide a more stable support structure, in some instances it may be more difficult to remove from the build piece due to the strength of its bond. Reusability may also be reduced since the materials have been exposed to sintering, albeit at comparatively low levels. These potential benefits and risks can be assessed to make an informed judgment about the appropriate process to employ for a given project involving PBF AM techniques.

Figure 10:
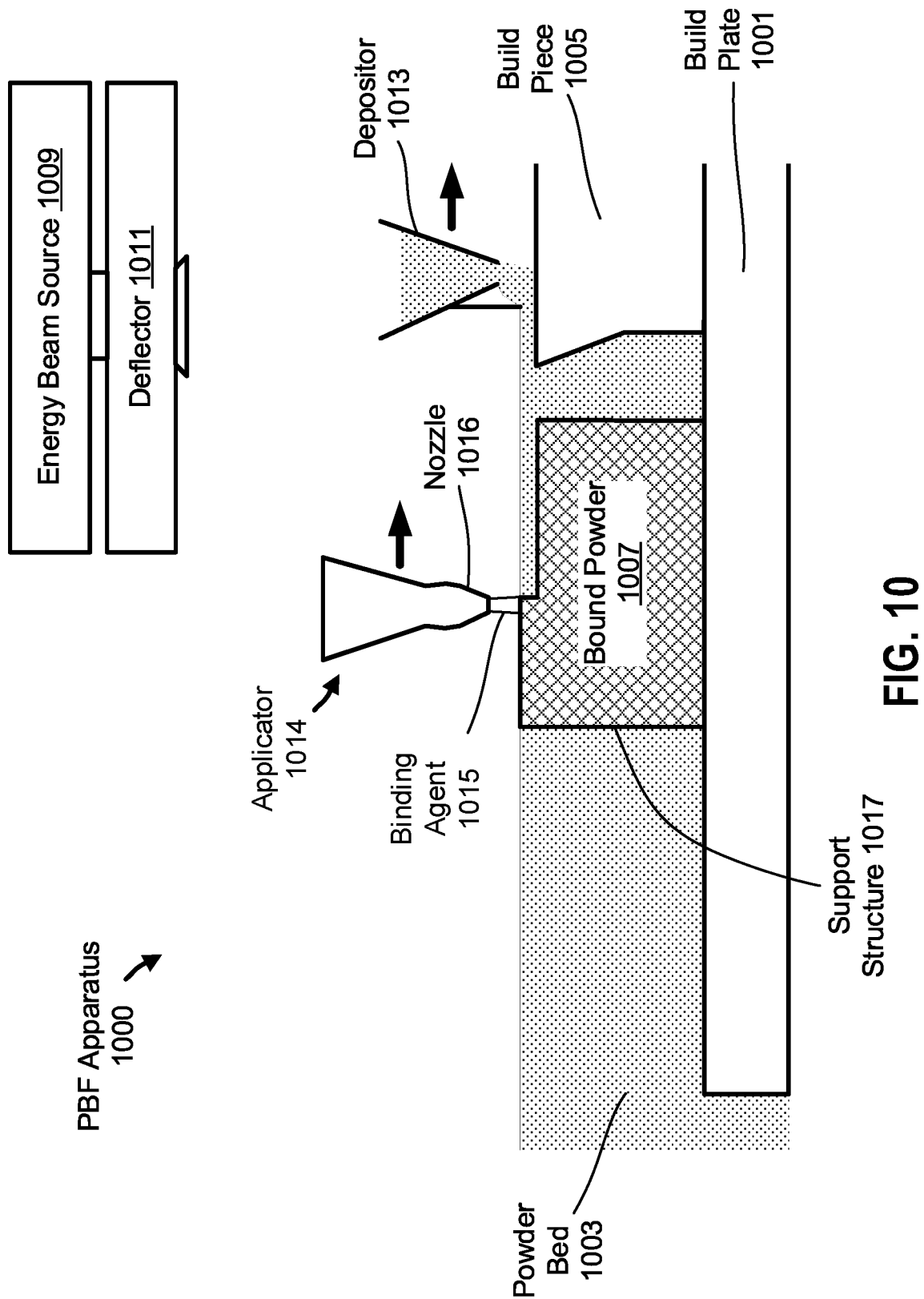
FIG. 10 illustrates an exemplary embodiment of a PBF apparatus and method for applying a binding agent to the powder.

FIG. 10 illustrates a side view of an exemplary embodiment of a PBF apparatus 1000 and method in which binding the powder includes applying a binding agent to the powder. FIG. 10 shows a build plate 1001 and a powder bed 1003. In powder bed 1003 is a build piece 1005 and bound powder 1007. PBF apparatus 1000 can include an energy beam source 1009, a deflector 1011, and a depositor 1013. PBF apparatus 1000 can also include an applicator 1014 that can operate as a powder fixer, such as powder fixer 415, by applying a binding agent to the powder.

Depositor 1013 can move across the work area to deposit a layer of powder. Here again, applicator 1014 can move across the work area following depositor 1013 and can apply a binding agent 1015 with a nozzle 1016 in an area of the layer deposited by the depositor to apply pressure on the area, thus binding the powder in the area to create bound powder 1007, which can form a support structure 1017. In this regard, bound powder 1007 can be built up in slices similar to the fusing of slices to form build piece 1005, except that instead of fusing the powder, applicator 1014 binds the powder with a binding agent.

In various embodiments, the binding agent may include a fluid or gel that can be deposited such that the powder is held to a sufficiently large degree to support the build piece (e.g., similar to wet sand being more bound together than dry sand). In various embodiments, the binding agent can include an adhesive agent, such as a resin. In some cases, the binding agent may include a material that can be thermally crosslinked by energy beam heating. In various embodiments, the binding agent could be applied by a print head that tracks across the powder bed behind the depositor 1013.

FIGS. 11A-C, 12A-C, 13, 14A-B, and 15 will now be described. These figures illustrate exemplary embodiments of systems and methods for support structures using materials other than powder, which can be referred to as non-powder support structures. Some examples of non-powder support structures include pre-formed support structures of various materials (e.g., metal, ceramic, etc.) that can be positioned before powder is deposited. Other examples of non-powder support structures can include high-density foams, fast-hardening gels, etc., that can be injected into areas devoid of powder before, during, or after powder is deposited, as explained in more detail below.

FIGS. 11A-C, 12A-C, and 13 illustrate exemplary embodiments of systems and methods for non-powder support structures in which non-powder support material can be formed in an area of a layer and powder can be deposited in the remaining area of the layer.

Figure 11A:
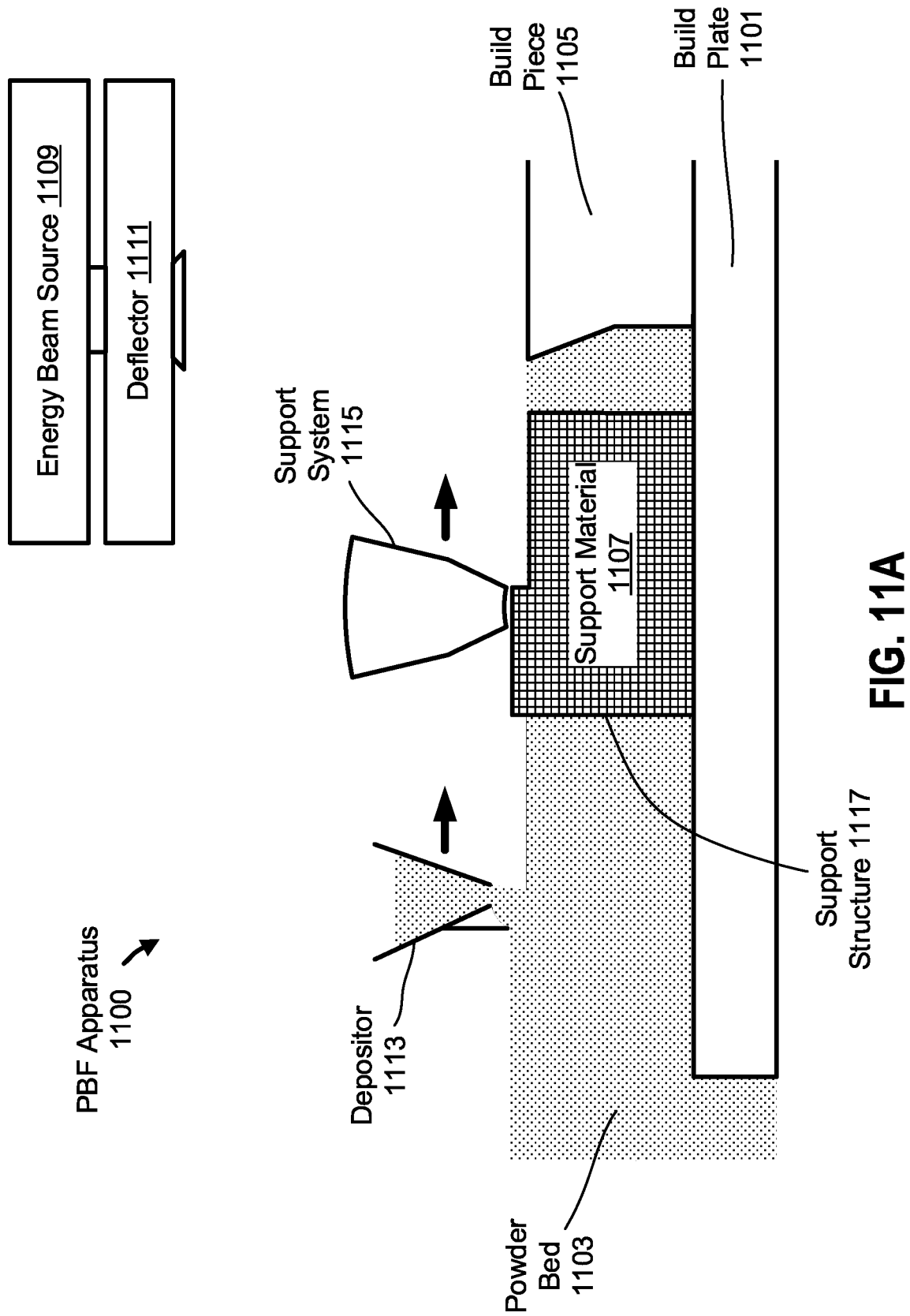
FIGS. 11A-C illustrate an exemplary embodiment of a PBF apparatus and method for non-powder support structures.
Figure 11B:
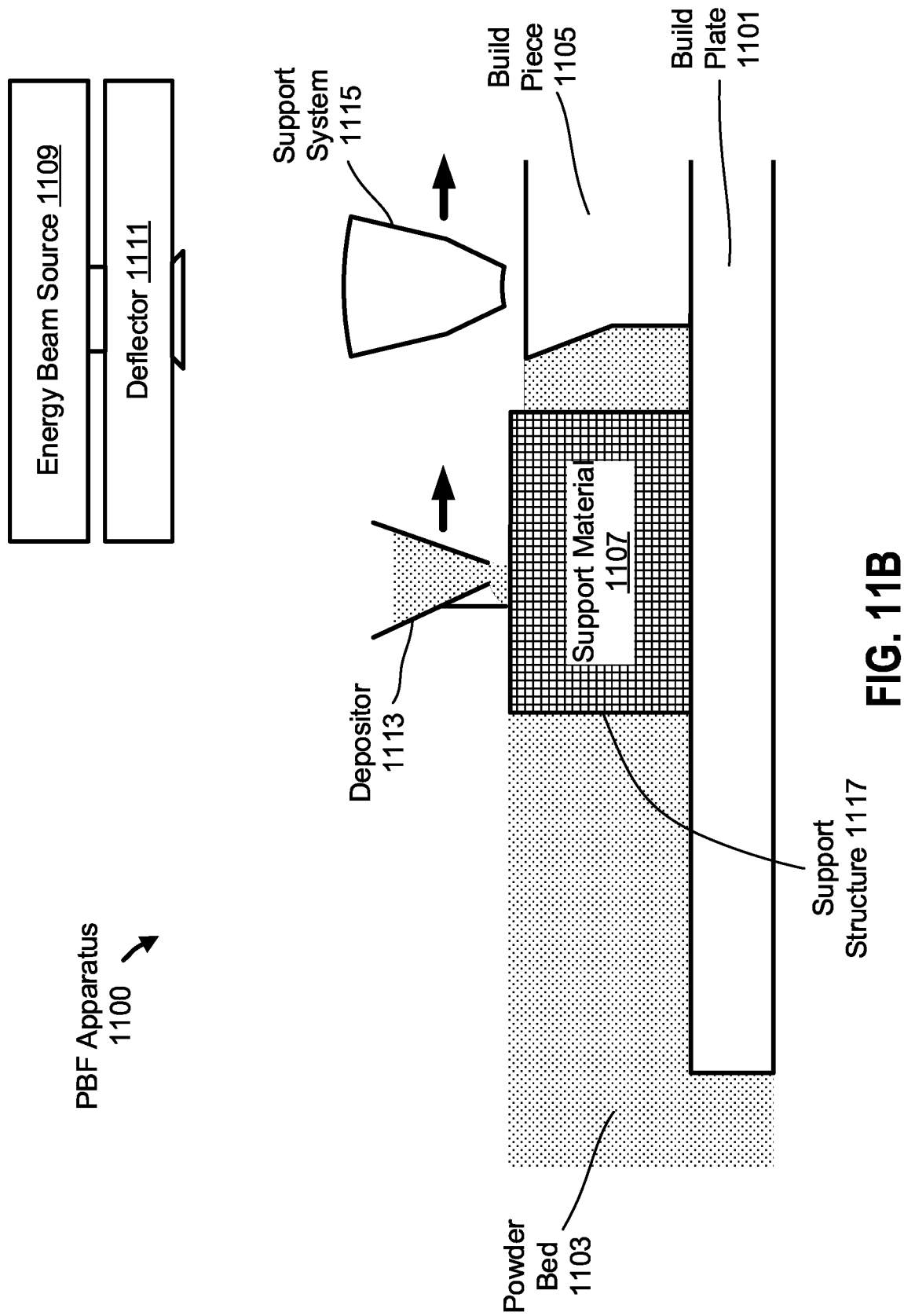
Figure 11C:
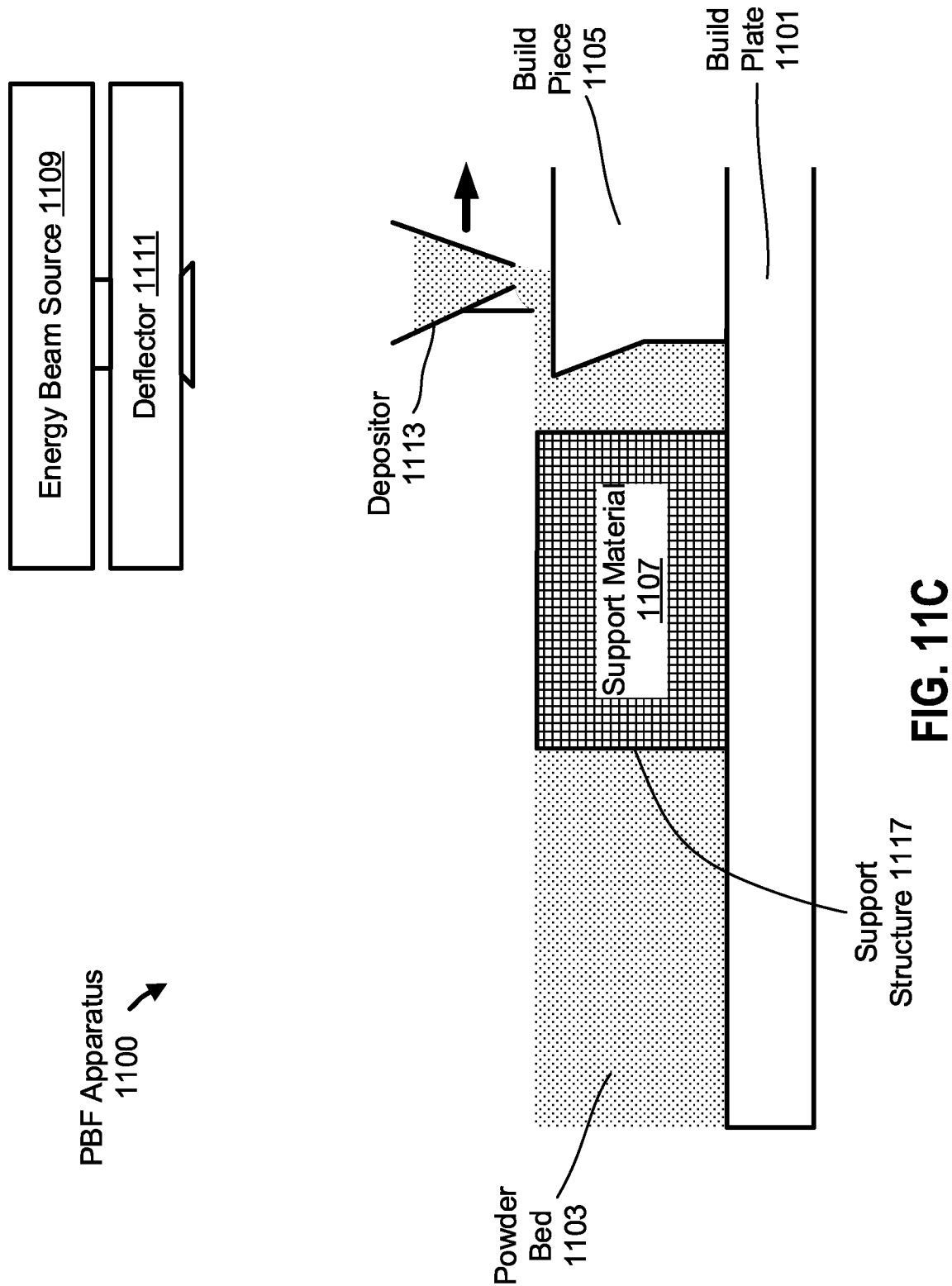

FIGS. 11A-C illustrate an exemplary embodiment of a system and method in which non-powder support material can first be established in an area of a layer, and then powder can be deposited in the remaining area of the layer. For example, a separate support material depositor can pass over the work area and deposit a layer of support material in the desired areas, then the powder depositor can pass over the work area and deposit the layer of powder in the remaining areas.

FIGS. 11A-C illustrate an exemplary PBF apparatus 1100 for forming a support structure of support material that does not include powder. FIGS. 11A-C show a build plate 1101 and a powder bed 1103. In powder bed 1103 is a build piece 1105 and support material 1107. PBF apparatus 1100 can include an energy beam source 1109, a deflector 1111, and a depositor 1113. PBF apparatus 1100 can also include a support system 1115.

FIG. 11A shows an exemplary operation of PBF apparatus 1100 to form support material 1107. Support system 1115 can move across the work area to deposit a layer of support material 1107 in an area of the layer, which can form a support structure 1117. Depositor 1113 can move across the work area following support system 1115 and deposit powder in a remaining area of the layer. However, in this embodiment depositor 1113 does not deposit support material 1107.

As shown in FIG. 11B, after the layer of support material 1107 has been formed, depositor 1113 can continue to move, thus crossing over the support material. In this example, depositor 1113 can continue to release powder, and the leveler of the depositor can sweep across the top surface of support material 1107 to clear the powder from the surface. In other embodiments, the depositor can interrupt the supply of powder as the depositor crosses over support material, for example.

FIG. 11C shows a state in which support system 1115 has moved across the work area and has finished depositing support material 1107 in the current layer. Depositor 1113 can continue to move across the work area and deposit powder in the remaining area that does not include support material 1107.

In various embodiments, the entire support structure may be deposited at once at the beginning of the build. For example, support system 1115 can include an automated robotic arm that can be programmed to position entire pre-formed support structures at the proper locations on build plate 1101 prior to the depositing of the first layer of powder. In this case, the support material can be deposited at a height greater than the height of the powder layers, until enough powder layers have been deposited to cover the support structure. Depositor 1113 can be configured to deposit powder only in areas without support structures such that the depositor avoids the portions of the support structures above the current layer. In various embodiments, the leveler of depositor 1113 can be configured to avoid areas that with support material protrude above the current layer of powder, until the powder layer is at a level that covers, or has reached the surface of, the support structure.

In an exemplary embodiment as noted above, the automated robotic arm is configured to place support structures at strategic locations on build plate 1101. In another exemplary embodiment, the robotic arm may be built in to the PBF apparatus and as such, can operate under control of the same processing and timing mechanisms and in synchronization with the other components for layering and placement, such as depositor 1113 and, where implemented, support system 1115.

Figure 12A:
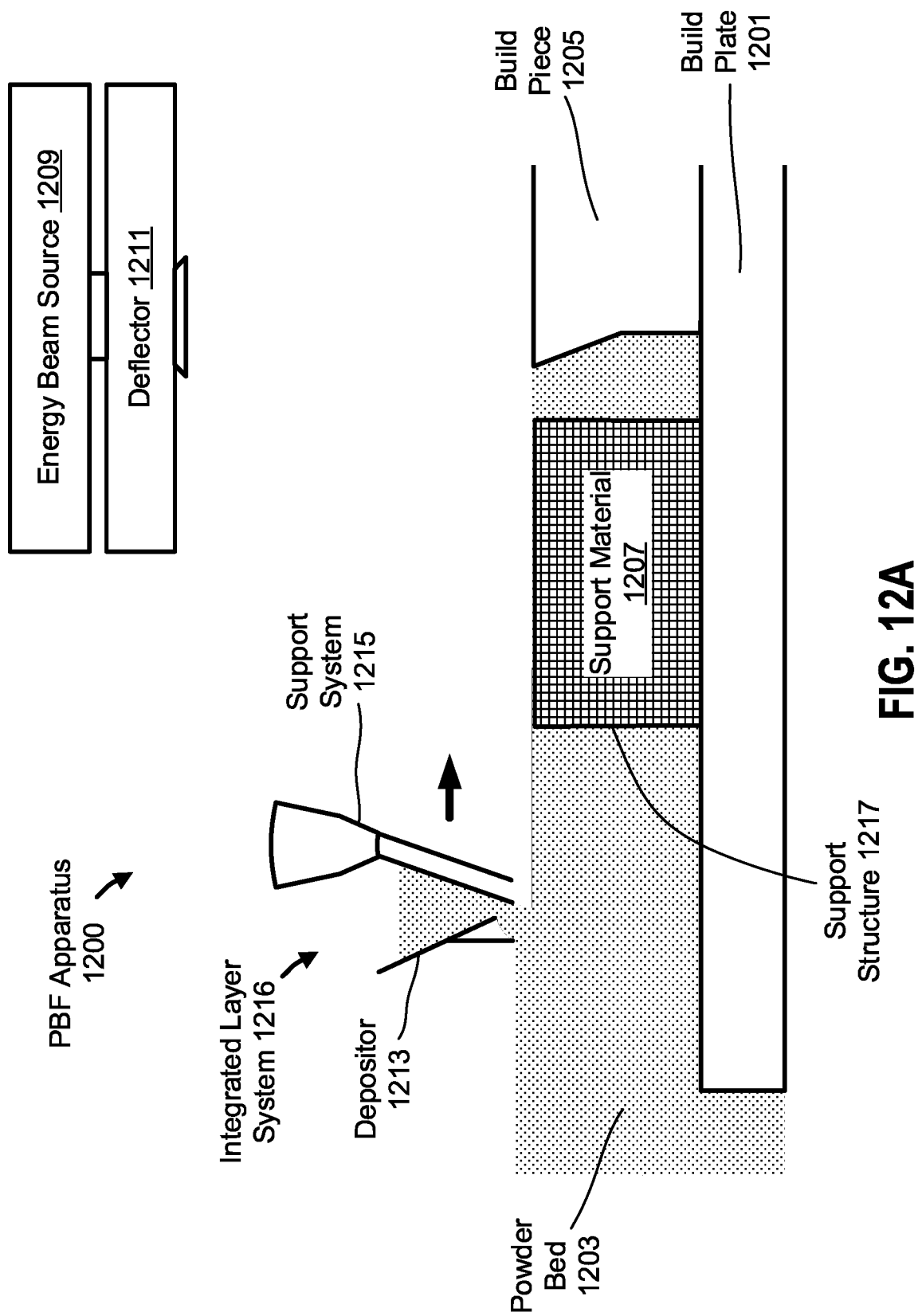
FIGS. 12A-C illustrate another exemplary embodiment of a PBF apparatus and method for non-powder support structures.
Figure 12B:
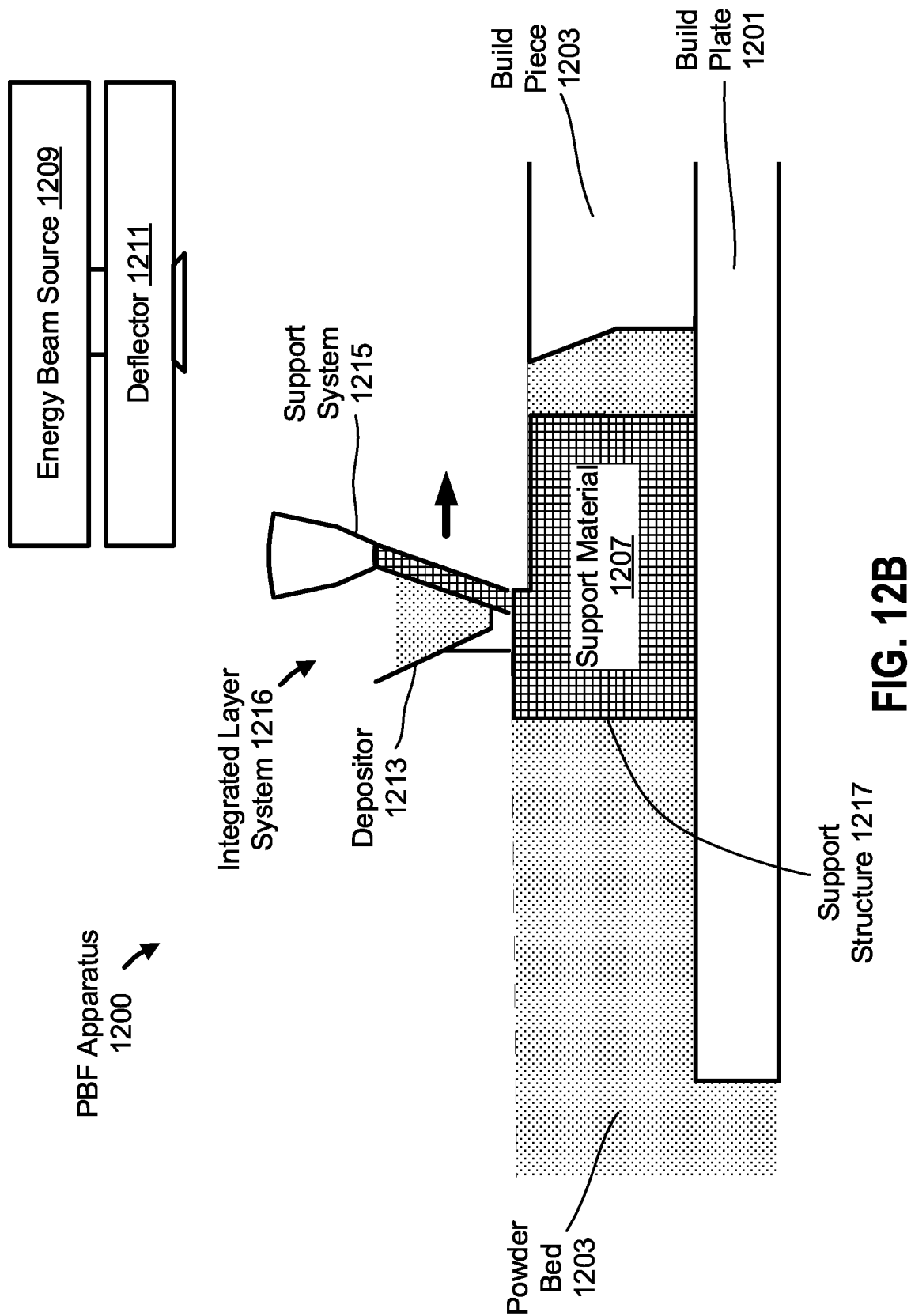
Figure 12C:
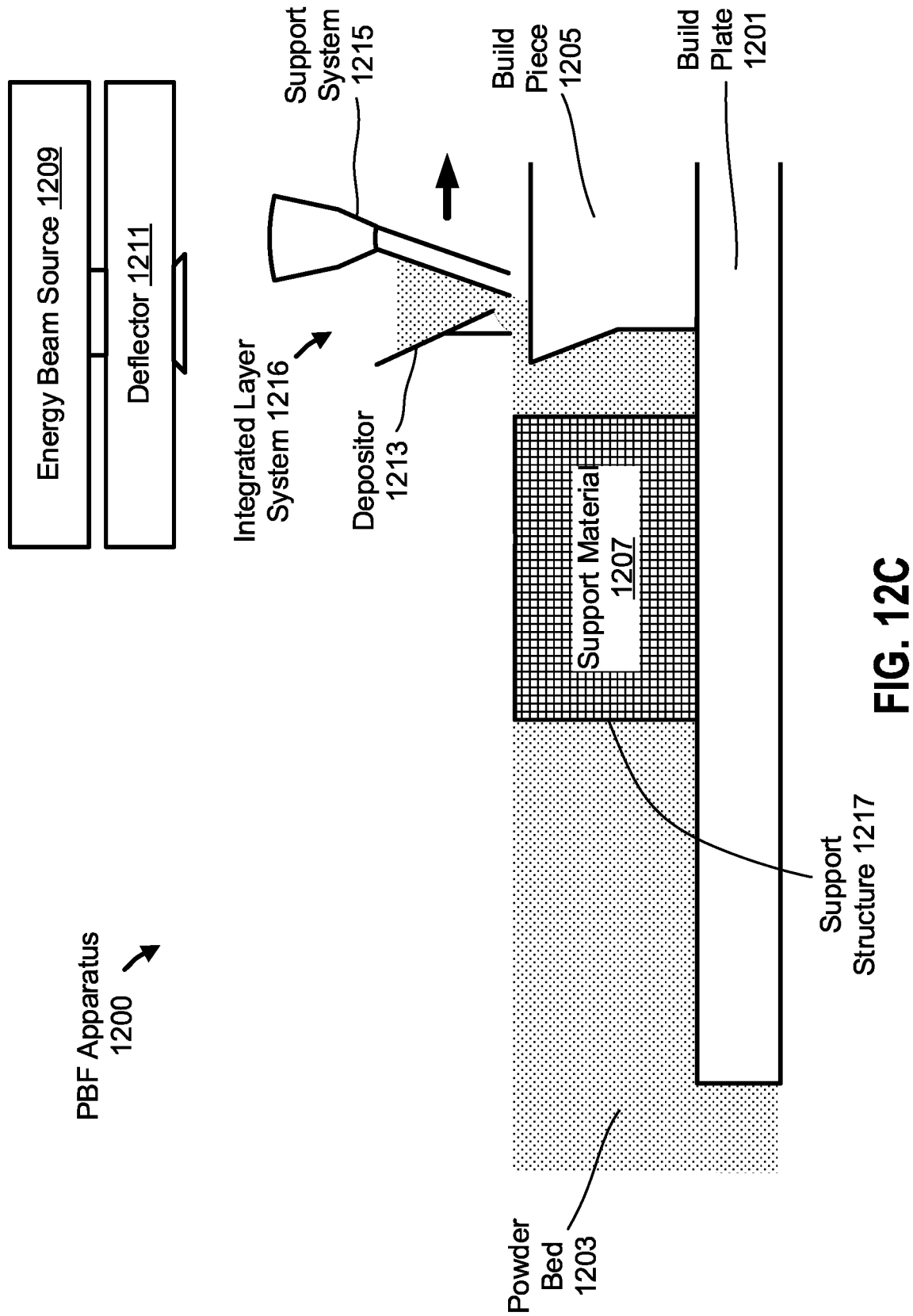

FIGS. 12A-C illustrate an exemplary embodiment of a PBF apparatus 1200 and method for non-powder support structures in which non-powder support material and powder can be alternately deposited during a single pass over the work area defined substantially by the surface area of build plate 1201 or some subset thereof. FIGS. 12A-C show a build plate 1201 and a powder bed 1203. In powder bed 1203 is a build piece 1205 and support material 1207. PBF apparatus 1200 can include an energy beam source 1209, a deflector 1211, and a depositor 1213, each of which may function in a manner consistent with prior embodiments. PBF apparatus 1200 can also include a support system 1215 that is integrated with depositor 1213 as an integrated layer system 1216.

FIG. 12A shows an example operation of PBF apparatus 1200 to form support material 1207. Integrated layer system 1216 can move across the work area to deposit a layer of powder in designated areas in which powder should be deposited. Specifically, when integrated layer system 1216 is above an area that has been designated for the deposition of powder, depositor 1213 of the integrated layer system can release powder, and support system 1215 can interrupt the release of support material to enable application of the correct amount of powder at that point. Thus, in this configuration, integrated layer system 1216 acts to selectively apply powder to designated portions of the work area.

FIG. 12B shows an example operation when integrated layer system 1216 has traversed an area in which support material should be deposited. In this case, support system 1215 of integrated layer system 1216 can deposit support material 1207 in the area of the layer, which can form a support structure 1217. Specifically, when integrated layer system 1216 is above an area for support material, depositor 1213 of the integrated layer system interrupts the release of powder, and support system 1215 is concurrently or substantially immediately thereafter enabled to release support material.

FIG. 12C shows a state in which integrated layer system 1216 has moved across the area for support material and continues to deposit powder in the remaining area for powder.

Integrated layer system 1216, in sum, constitutes support system 1215 and depositor 1213 operating in a selective mode under software or dedicated hardware control to deposit a given material depending on the location of the system 1216 relative to the work area. However, this configuration is not intended to be limiting, as any number of equally suitable means to perform the identified functions may be contemplated by those skilled in the art upon perusal of the present disclosure.

Figure 13:
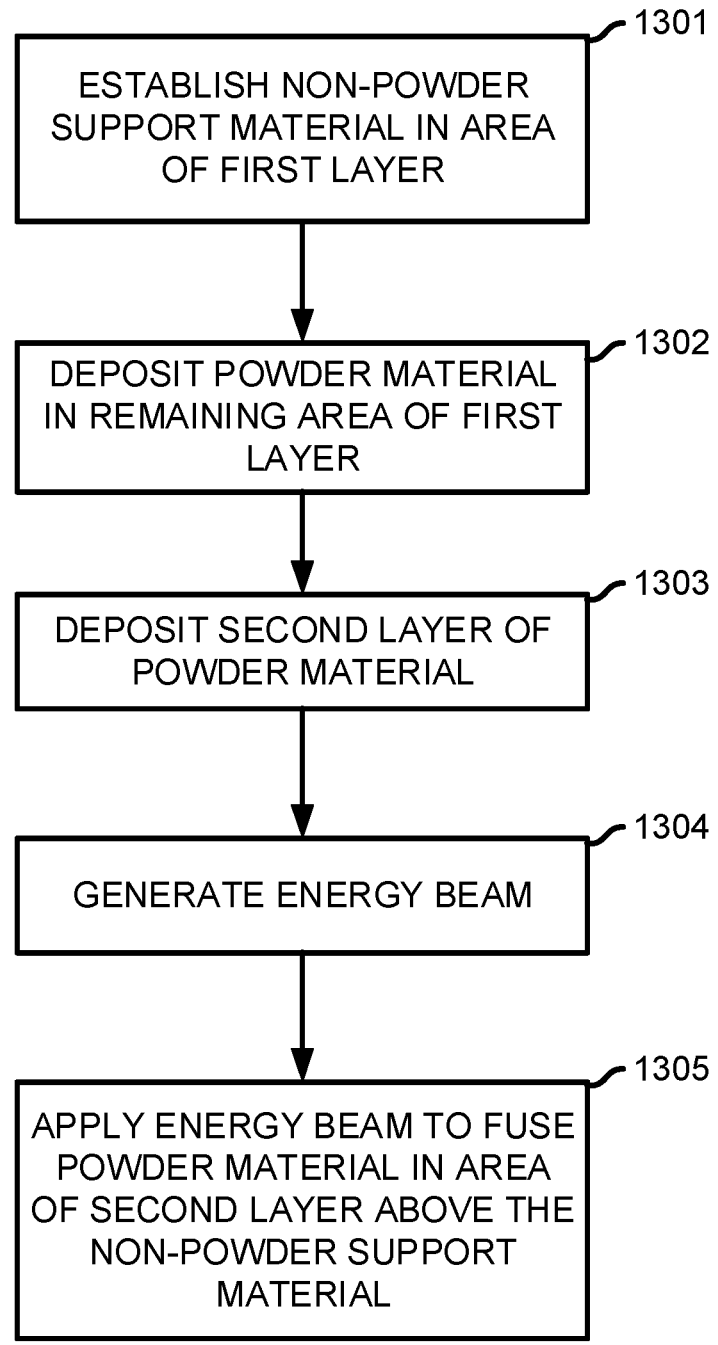
FIG. 13 is a flowchart of an exemplary embodiment of a method of forming non-powder support structures in a PBF apparatus.

FIG. 13 is a flowchart of an exemplary embodiment of a method of forming non-powder support structures in a PBF apparatus, such as in FIGS. 11A-C and 12A-C. A PBF apparatus can establish (1301) non-powder support material in an area of a first layer and can deposit (1302) powder material in the remaining area of the first layer. The PBF apparatus can deposit (1303) a second layer of powder material above the first layer. The PBF apparatus can generate (1304) an energy beam and can apply (1305) the energy beam to fuse powder material in an area of the second layer above the non-powder support material in the first layer.

Figure 14A:
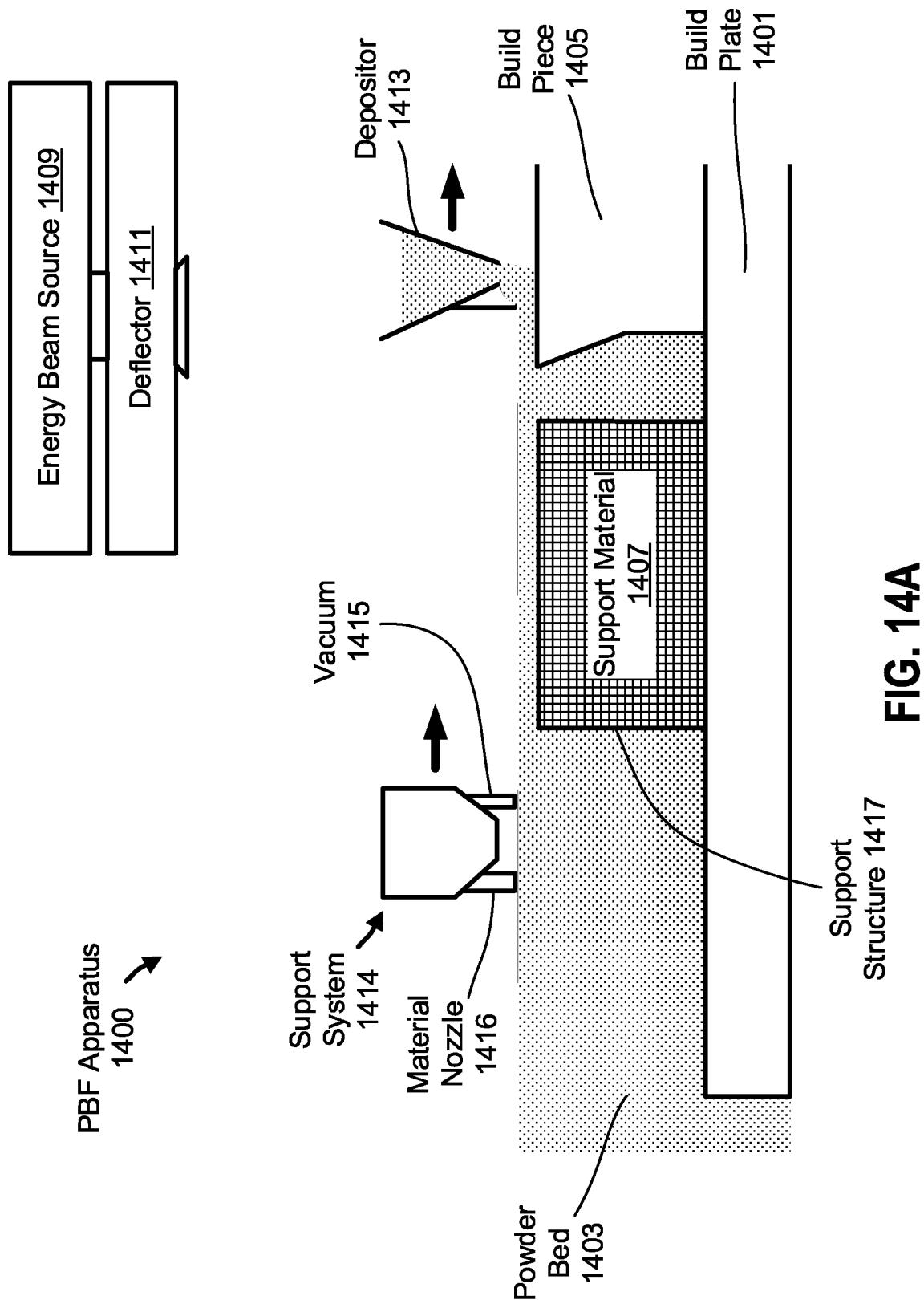
FIGS. 14A-B illustrate an exemplary embodiment of a PBF apparatus and method.
Figure 14B:
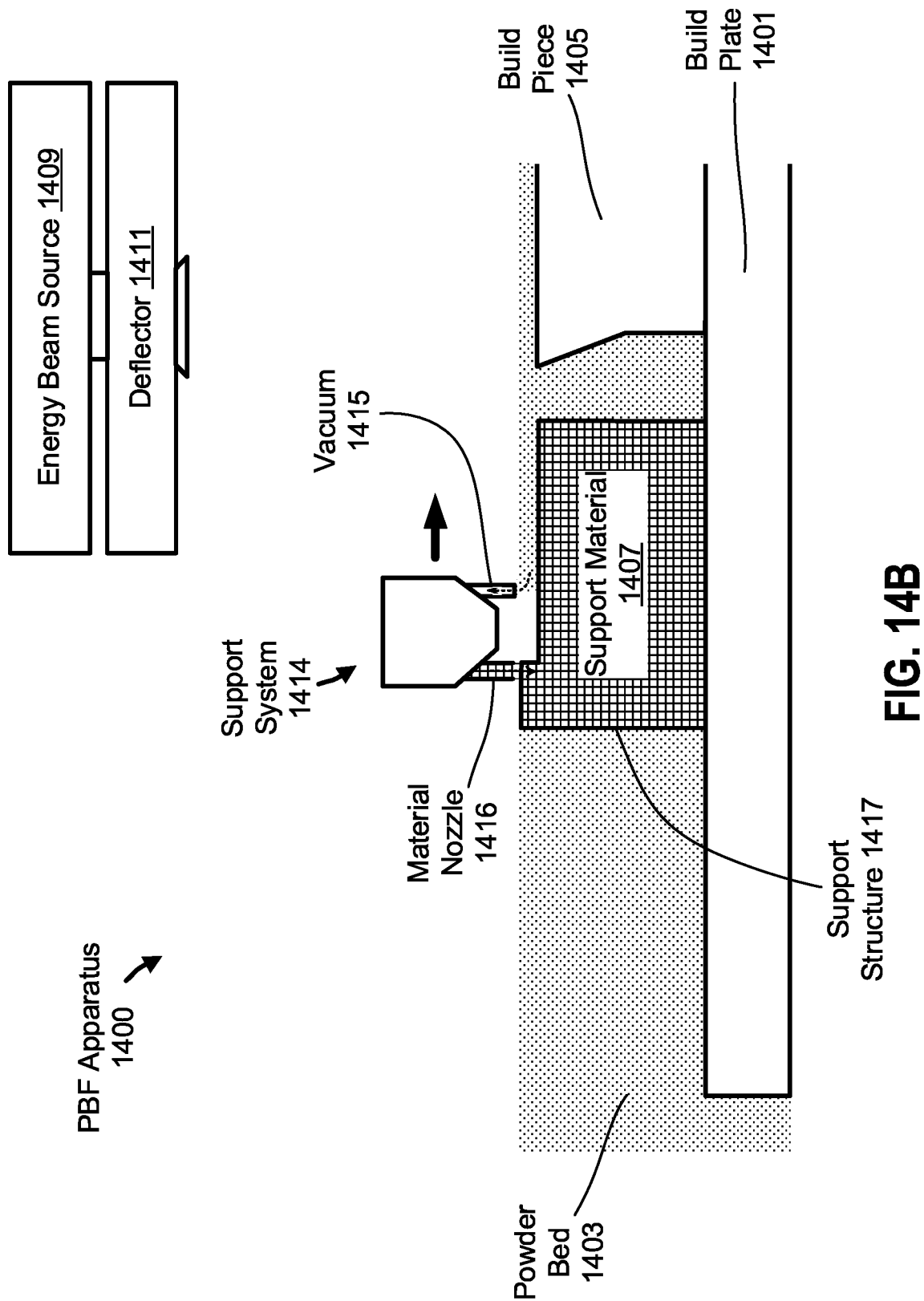
Figure 15:
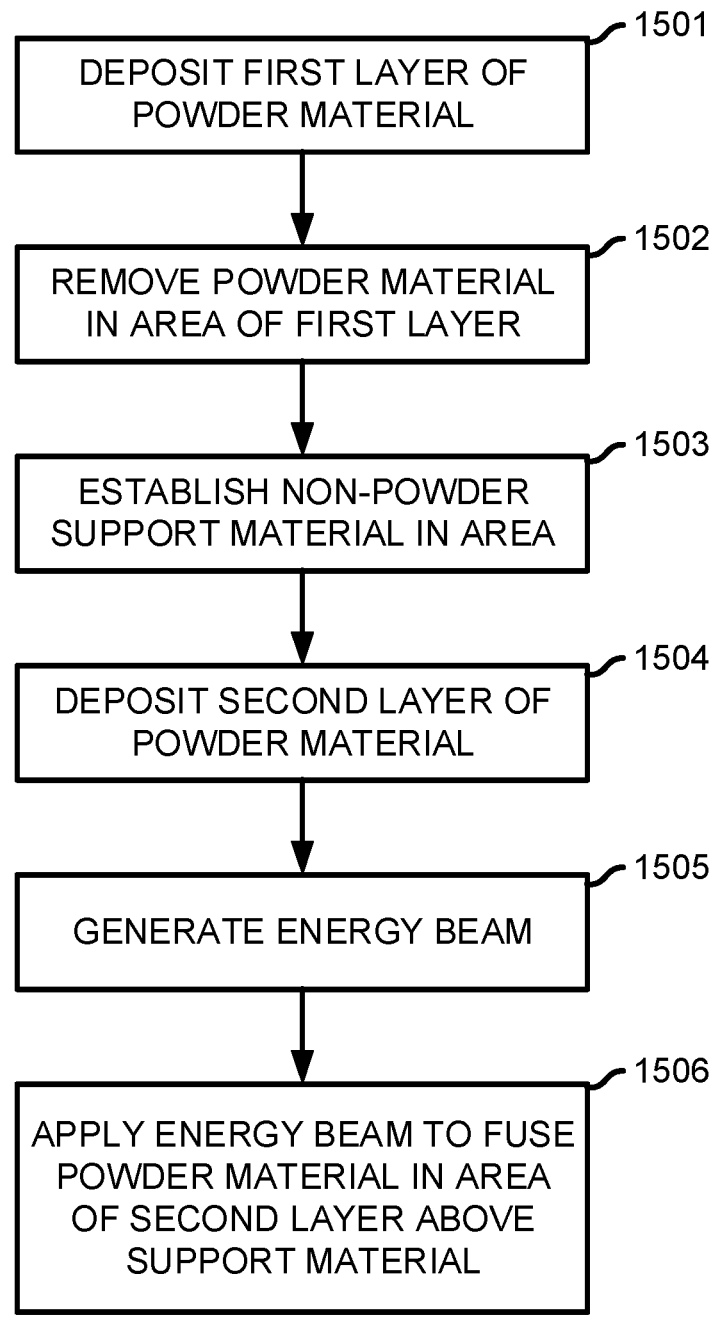
FIG. 15 is a flowchart of an exemplary embodiment of a method of forming non-powder support structures in a PBF apparatus.

FIGS. 14A-B and 15 illustrate exemplary embodiments of systems and methods for non-powder support structures in which powder can first be deposited over an entire layer, the powder in an area of the layer can be removed to form a void in the layer, and then non-powder support material can be established in the void area.

In some cases, the powder depositor may deposit a layer of powder, and then a vacuum in the build chamber may remove powder from areas that should be empty. The empty areas can then be filled with support material, such as foam or another space keeper. For example, the foam may be injected or placed as bricks/plates of a height configured to fit in the layer. Other mechanical-based powder removal means may be used.

FIGS. 14A-B illustrate an exemplary embodiment of a PBF apparatus 1400 and method. FIGS. 14A-B show a build plate 1401 and a powder bed 1403. In powder bed 1403 is a build piece 1405 and support material 1407. PBF apparatus 1400 can include an energy beam source 1409, a deflector 1411, and a depositor 1413. PBF apparatus 1400 can also include a support system 1414 that can include a vacuum 1415 and a material nozzle 1416.

FIG. 14A shows an example operation of PBF apparatus 1400 in which depositor 1413 moves across the work area and deposits a layer of powder, and support system 1414 moves across the work area in sequence behind the depositor. Support system 1414 in this example is configured to remove powder deposits from designated portions of the work area using a vacuum mechanism and concurrently or immediately thereafter to deposit support material onto the designated portions. In FIG. 14A, support system 1414 is operational but is not activated to perform its functions due to its determined position over the work area. FIG. 14B shows an example of a later state in which support system 1414 passes above an area in which support material should be deposited. As support system 1414 passes above the area, vacuum 1415 can remove deposited powder via suctioning, and material nozzle 1416 can deposit support material 1407 in the area, which can form a support structure 1417.

In various embodiments, the support material can be deposited at a height greater than the height of the layer. For example, the entire support structure may be deposited at once at the beginning of the build. In this case, the powder depositor can be configured to deposit powder only in areas without support structures such that the depositor avoids the portions of the support structures above the current layer. For example, the wiping/leveling system of the depositor could be configured to miss any areas that are built up with support material, until, for example, the powder layer is at a level that covers the support material.

In various embodiments, the support material could remain in the final part, or be dissolved away, for example.

FIG. 15 is a flowchart of an exemplary embodiment of a method of forming non-powder support structures in a PBF apparatus, such as in FIGS. 14A-B. A PBF apparatus can deposit (1501) a first layer of powder material. The PBF can then remove (1502) powder material in an area of the first layer and can establish (1503) non-powder support material in the area of removed powder. The PBF apparatus can then deposit (1504) a second layer of powder material above the first layer. The PBF apparatus can generate (1505) an energy beam and can apply (1506) the energy beam to fuse powder material in an area of the second layer above the non-powder support material in the first layer.

FIGS. 16-25 illustrate example configurations for support structures and example systems and methods for removal of support structures. In these examples, fused-powder support structures will be described. As mentioned above, fused-powder support structures, i.e., support structures that can be formed exclusively of melted powder, may be beneficial in cases in which, for example, it is desirable to prevent contamination of the powder by other materials. However, it should be understood that the example configurations could be formed from other types of support structures, such as bound-powder support structures, non-powder support structures, etc.

Figure 16:
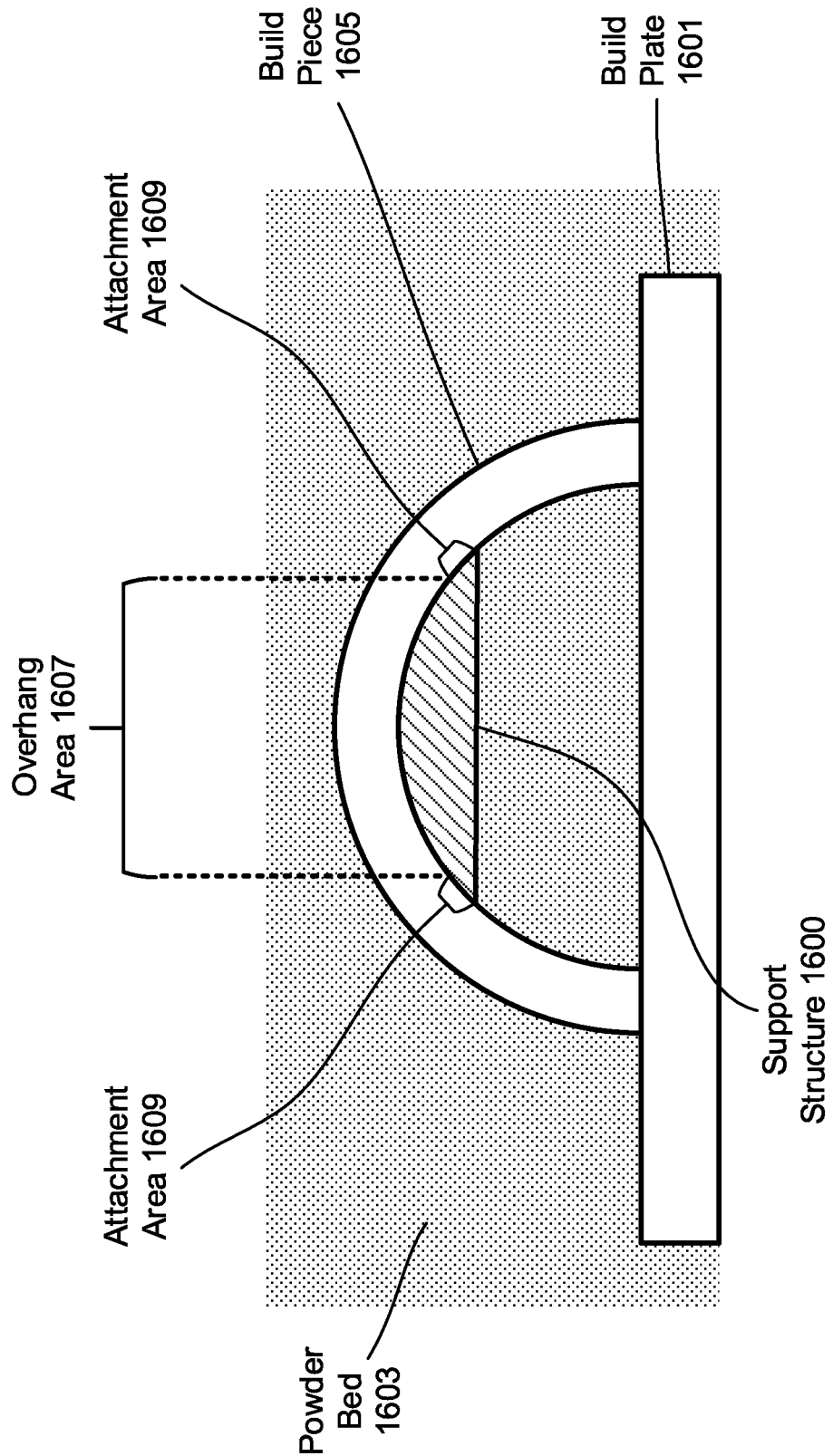
FIG. 16 illustrates an exemplary embodiment of an anchored support structure.

FIG. 16 illustrates an example support structure 1600 that does not extend all of the way down to the build plate, and that is attached to a portion of the build piece outside of an overhang area. These types of support structures can be referred to as anchored support structures.

FIG. 16 shows a build plate 1601, a powder bed 1603, and a build piece 1605. The build piece 1605 is curved like an arch, thereby necessitating some modicum of support in an overhang area 1607. A portion of build piece 1605 can be in an overhang area 1607. Similar to floating support structures, support structure 1600 does not extend down to build plate 1601. However, in contrast to floating support structures, support structure 1600 forms an attachment to build piece 1605 at a portion of the build piece outside of overhang area 1607. In this configuration, the attachment is made in two attachment areas 1609, where the attachment can be seen to occur outside the overhang area 1607. Attachment areas 1609 can provide highly effective support using support structures to a variety of structural build pieces including, for example, build piece 1605. Support structure 1600 facilitates a supportive connection to sustain the structural integrity of build piece 1605. Support structure 1600 can effectively support portions of build piece 1605 in overhang area 1607 even though the support structure does not extend all of the way to build plate 1601. Similar to floating support structures, anchored support structures can result in an area of fused powder in the overhang area of the build piece that is above an area of bound powder, which is above an area of not-fused and not-bound powder. Integrity of the support may be facilitated by the strategic placement of the support structures at attachment areas 1609 outside the overhang area.

Anchored support structures can share many of the same advantages as floating support structures. For example, anchored support structures can allow less powder to be used to form the support structures, which may reduce build time, allow more powder to be recovered and reused, etc., and may allow additional build pieces to be built more efficiently during a single PBF printing run. In addition, because of the added support provided by attachment to the build piece, anchored support structures may potentially be made smaller than a floating support structure, thus allowing a greater amount of loose powder to be used for other build pieces or recovered and reused.

Figure 17:
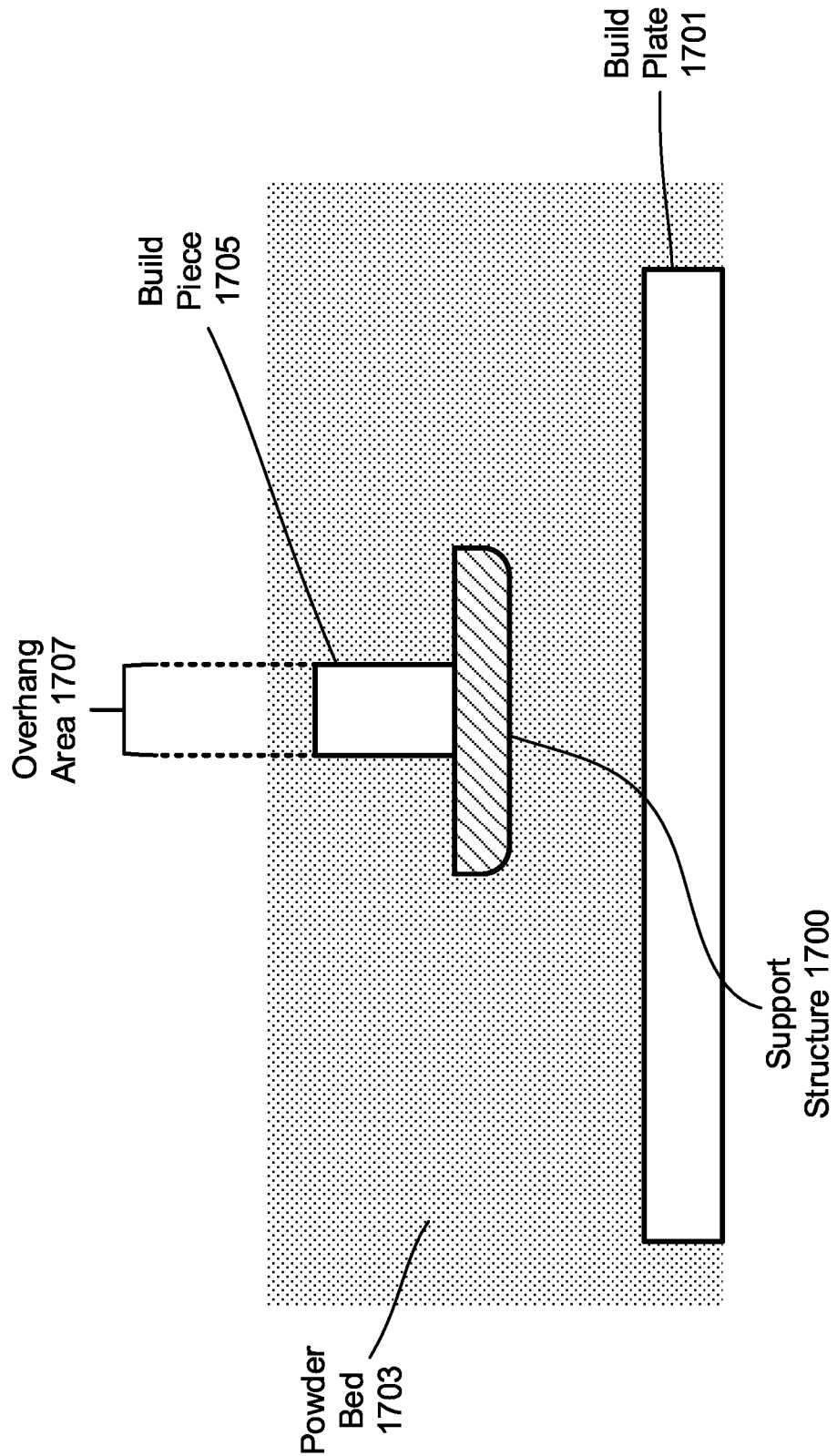
FIG. 17 illustrates an exemplary embodiment of a floating support structure.

FIG. 17 illustrates an example support structure 1700 that does not extend all of the way down to the build plate and also does not include attachment points to the build piece at locations outside of an overhang area. FIG. 17 shows a build plate 1701, a powder bed 1703, and a build piece 1705. A portion of build piece 1705 can be in an overhang area 1707. In this case, the entire build piece 1705 is in overhang area 1707. Support structure 1700 does not extend down to build plate 1701. However, support structure 1700 can support build piece 1705 because the support structure can 'float' on loose powder in powder bed 1703. As described above with respect to FIG. 6, bound powder 1709 can be formed to cover wider area than overhang area 1707, such that deformation forces in the downward direction from build piece 1705 can be distributed to a greater area of loose powder. In this way, the force can be distributed in such a way that the loose powder underneath support structure 1700 can provide an adequately non-deformable link between the support structure and build plate 1701. Therefore, support structure 1700 can effectively support portions of build piece 1705 in overhang area 1707 even though the support structure does not extend all of the way to build plate 1701. As in the example of FIG. 6, the configuration of FIG. 17 results in an area of fused powder of the build piece that is above an area of bound powder, which is above an area of not-fused and not-bound powder.

In various embodiments, support structure 1700 can form an attachment with build piece 1705, and in various embodiments support structure 1700 may not form an attachment with build piece 1705. For example, in embodiments in which the support structure is formed using fused powder, the support structure can be attached to the build piece. In embodiments in which the support structure is formed using compacted powder, the support structure can be unattached to the build piece. In embodiments in which the support structure is formed using powder that is bound with a binding agent, such as a non-adhesive liquid or gel, the support structure can be unattached to the build piece. In embodiments in which the support structure is formed using powder that is bound with a binding agent, such as an adhesive liquid or gel, the support structure can be unattached to the build piece.

As mentioned above with reference to FIG. 6, floating support structures may offer advantages such as allowing less powder to be used to form the support structures, which may reduce build time, allow more powder to be recovered and reused, allow more loose powder to be used to create other build pieces, etc. For example, floating support structures may allow additional build pieces to be built more efficiently during a single PBF printing run by arranging multiple floating support structures vertically in the powder bed to support multiple smaller (i.e., shorter) build pieces during a printing run that includes a larger (i.e., taller) build piece. In this way, for example, multiple build pieces could be printed in a vertical stack. This could allow a larger amount of the powder bed to be used for printing build pieces, leading to a more efficient printing process with more build pieces printed per printing run.

FIGS. 18-22 illustrate example configurations for support structures including resonant structures and systems and methods for removing these types of support structures.

In various embodiments, support structures can be configured to include resonant structures. Vibration of resonant support structures in its natural frequency can cause the support structure to more easily break away from the 3-D build piece and/or the build plate. This can be due, for example, to metal fatigue at the interface between the support structure and the build piece and/or build plate.

Figure 18:
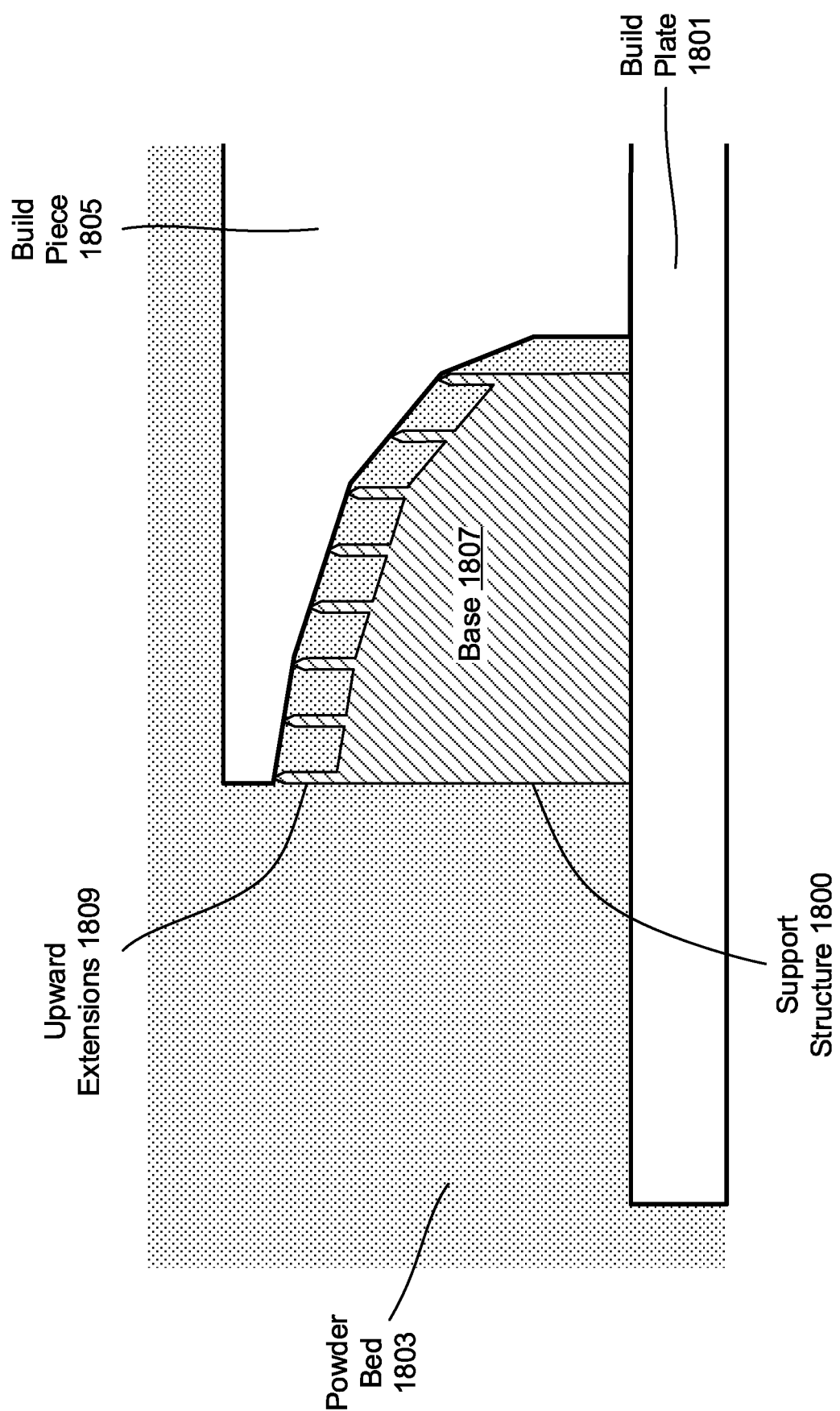
FIG. 18 illustrates an exemplary embodiment of a support structure including resonant structures in a half-wave resonator configuration.

FIG. 18 illustrates an example support structure 1800 including resonant structures in a half-wave resonator configuration with upward extensions to interface with the build piece. FIG. 18 shows a build plate 1801, a powder bed 1803, and a build piece 1805. Support structure 1800 can include a base 1807 and upward extensions 1809. The ends of upward extensions 1809 can form attachments with build piece 1805 at the interface, which can support the build piece. Each upward extension 1809 can be a resonant structure, i.e., can resonate at a resonance frequency. In this example, upward extensions 1809 can be of equal length and can have the same resonance frequency. Furthermore, in this example, each upward extension 1809 can be a half-wave resonator, such that application of a resonance frequency would cause a large amplitude swing to be generated at the end of each upward extension, which is the location of the interface between the upward extension and build piece 1805. In this way, for example, applying a resonance frequency can cause a large stress on the ends of upward extension 1809 as the ends attempt to vibrate while being attached to build piece 1805. The stress caused by applying the resonance frequency can cause the ends of upward extensions 1809 to break away from build piece 1805, thus removing support structure 1800 from the build piece.

In this example, support structure 1800 includes extensions of fixed length, width and taper. In various embodiments, extensions may have different lengths and/or widths, and can have different resonant frequencies, for example, which can allow different portions of the support structure to be removed using different frequencies. In various embodiments, extensions may have different tapers, or no taper, for example.

Figure 19:
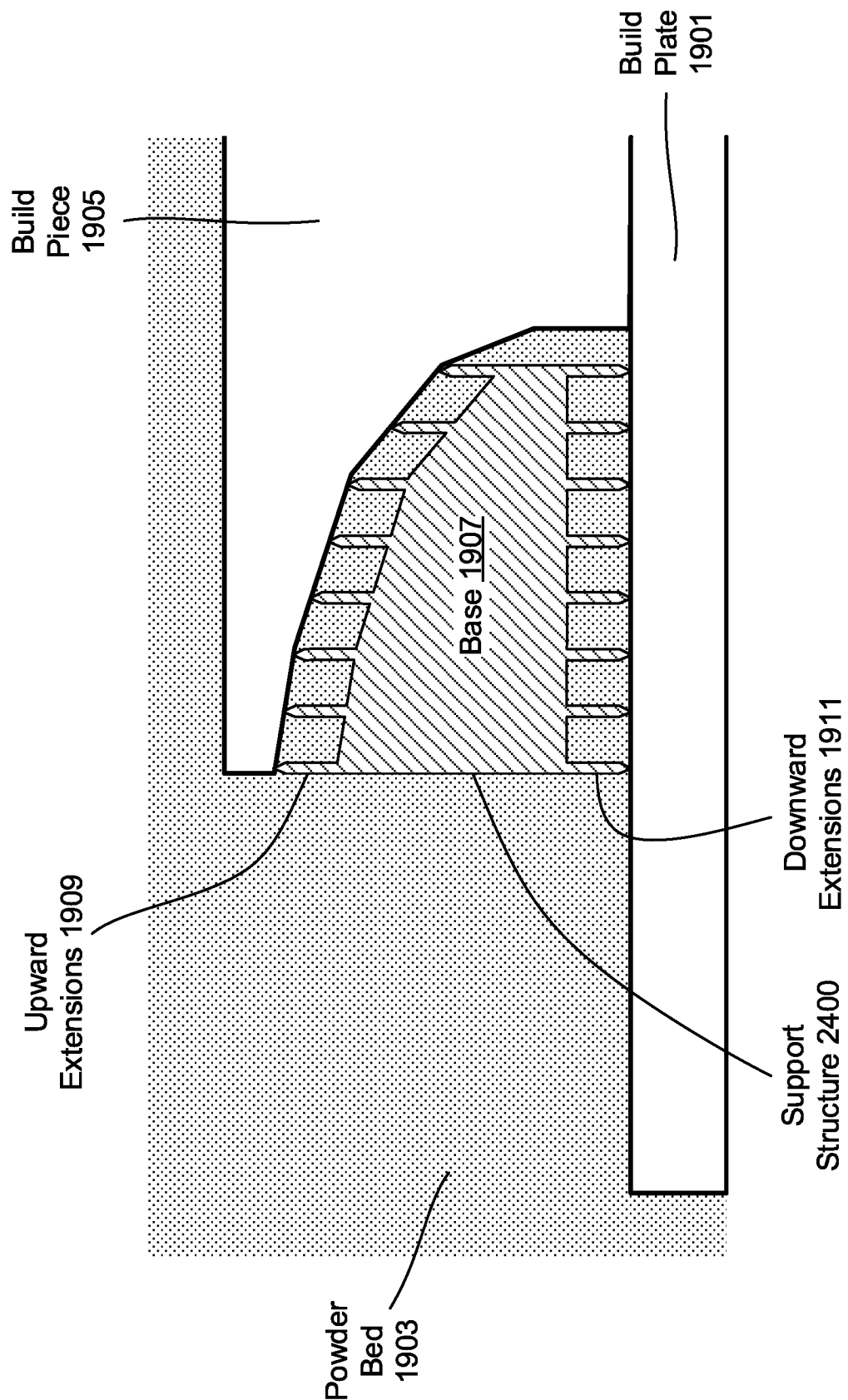
FIG. 19 illustrates an exemplary embodiment of a support structure including resonant structures in another half-wave resonator configuration.

FIG. 19 illustrates an example support structure 1900 including resonant structures in a half-wave resonator configuration with upward extensions to interface with the build piece and downward extensions to interface with the build plate. FIG. 19 shows a build plate 1901, a powder bed 1903, and a build piece 1905. Support structure 1900 can include a base 1907, upward extensions 1909, and downward extensions 1911. The ends of upward extensions 1909 can taper down and form attachments with build piece 1905 at the build piece interface, which can support the build piece. The ends of downward extensions 1911 can form attachments with build plate 1901 and the build plate interface, which can support the support structure 1900. Each upward extension 1909 and each downward extension 1911 can be a resonant structure, i.e., can resonate at a resonance frequency. In this example, upward extensions 1909 and downward extensions 1911 can be of equal length and can have the same resonance frequency. Furthermore, in this example, each upward extension 1909 and downward extension 1911 can be a half-wave resonator, such that application of a resonance frequency would cause a large amplitude swing to be generated at the end of each upward extension and at the end of each downward extension. In this way, for example, applying a resonance frequency can cause a large stress on the ends the extensions as the ends attempt to vibrate while being attached at the interfaces. The stress caused by applying the resonance frequency can cause the ends to break away from the interfaces, thus removing support structure 1900 from build piece 1905 and build plate 1901.

In this example, support structure 1900 includes extensions of fixed length, width and taper. In various embodiments, extensions may have different lengths and/or widths, and can have different resonant frequencies, for example, which can allow different portions of the support structure to be removed using different frequencies. In various embodiments, extensions may have different tapers, or no taper, for example.

Figure 20:
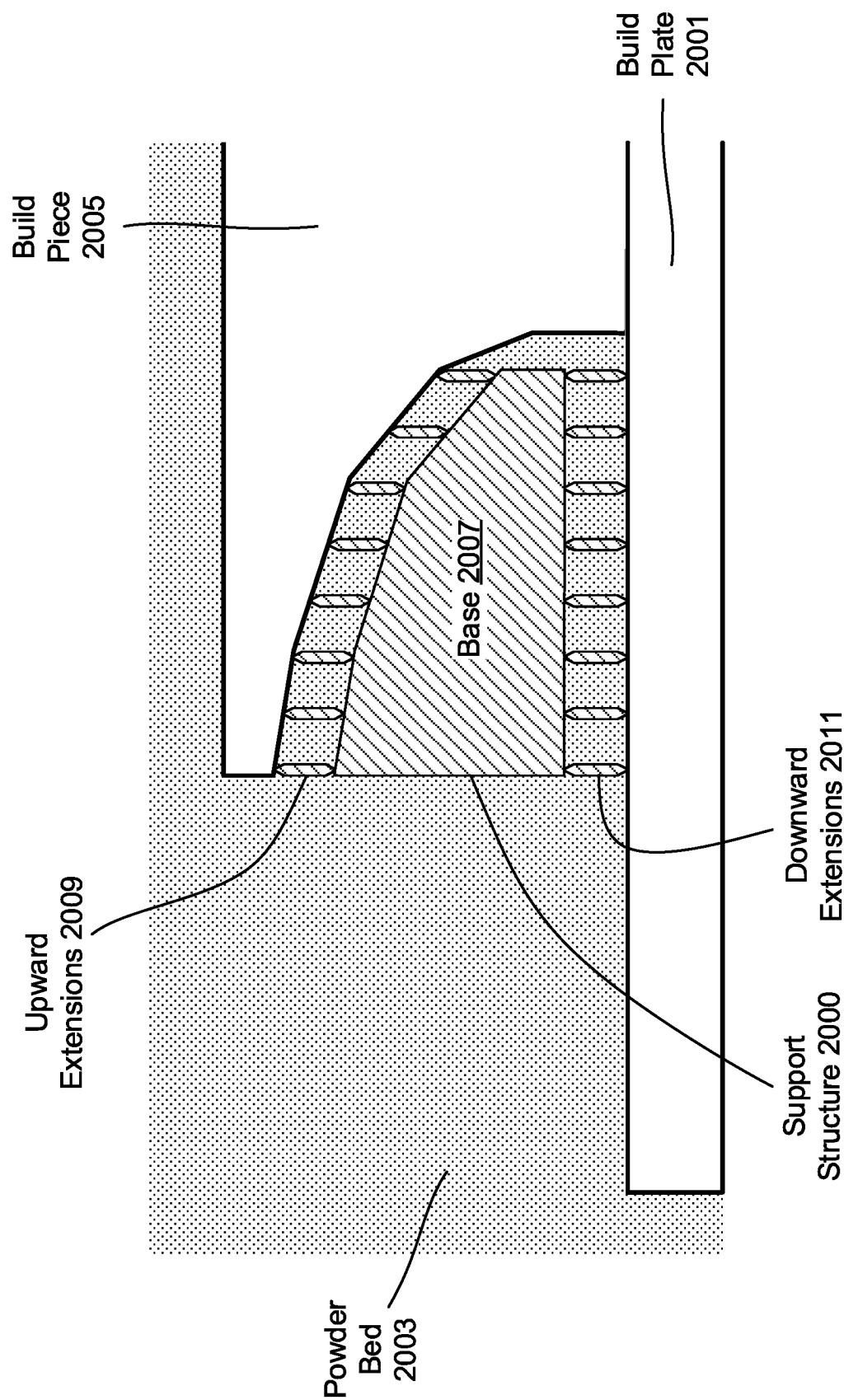
FIG. 20 illustrates an exemplary embodiment of a support structure including resonant structures in a quarter-wave resonator configuration.

FIG. 20 illustrates an example support structure 2000 including resonant structures in a quarter-wave resonator configuration with upward extensions to interface with the build piece and downward extensions to interface with the build plate. FIG. 20 shows a build plate 2001, a powder bed 2003, and a build piece 2005. Support structure 2000 can include a base 2007, upward extensions 2009, and downward extensions 2011. The ends of upward extensions 2009 can taper down and form attachments with build piece 2005 at the build piece interface, which can support the build piece. The ends of downward extensions 2011 can taper down and form attachments with build plate 2001 and the build plate interface, which can support the support structure 2000. In addition, the base of each upward extension 2009 and the base of each downward extension 2011 can taper at the attachment to base 2007.

Each upward extension 2009 and each downward extension 2011 can be a resonant structure, i.e., can resonate at a resonance frequency. In this example, upward extensions 2009 and downward extensions 2011 can be of equal length and can have the same resonance frequency. Furthermore, in this example, each upward extension 2009 and downward extension 2011 can be a quarter-wave resonator, such that application of a resonance frequency would cause a large amplitude swing to be generated at the end of each upward extension and each downward extension and also at the base of each upward extension and the base of each downward extension. In this way, for example, applying a resonance frequency can cause a large stress on the ends and the bases of the extensions as the ends and bases attempt to vibrate while being attached at interfaces. The stress caused by applying the resonance frequency can cause the ends and bases of the extensions to break away from the interfaces, thus removing support structure 2000 from build piece 2005 and build plate 2001.

In this example, support structure 2000 includes extensions of fixed length, width and taper. In various embodiments, extensions may have different lengths and/or widths, and can have different resonant frequencies, for example, which can allow different portions of the support structure to be removed using different frequencies. In various embodiments, extensions may have different tapers, or no taper, for example.

It should be noted that various concepts described herein can be combined and modified, as one skilled in the art would readily understand. To illustrate this point, FIG. 21 shows an example configuration of a support structure that includes resonant structures and a floating base.

Figure 21:
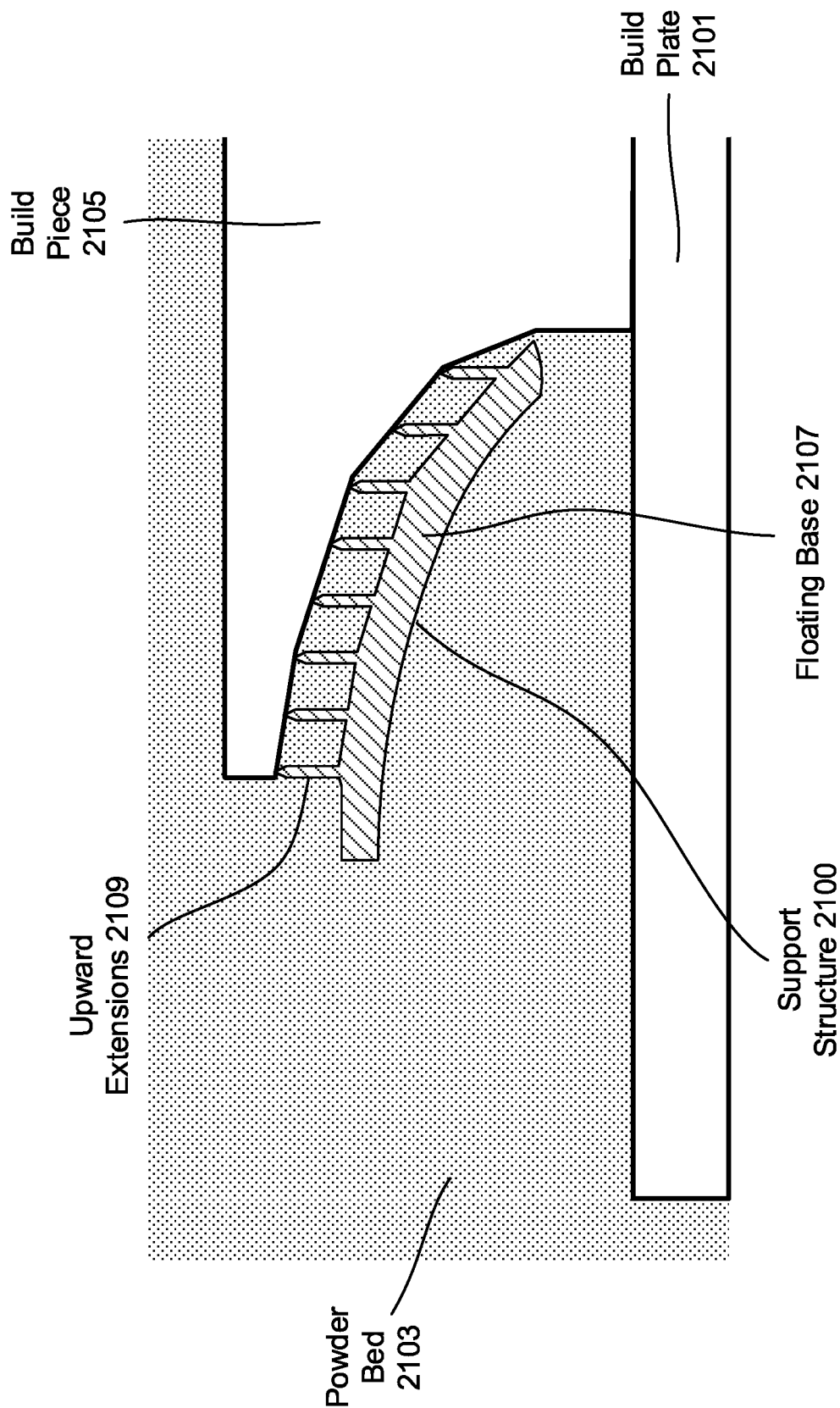
FIG. 21 illustrates an exemplary embodiment of a support structure.

FIG. 21 illustrates an example support structure 2100 according to various embodiments. FIG. 21 shows a build plate 2101, a powder bed 2103, and a build piece 2105. Support structure 2100 can include a base 2107 and upward extensions 2109. Base 2107 can be configured to float on the loose powder below, similar to embodiments described above with reference to FIGS. 6 and 17. Upward extensions 2009 can be resonant structures similar to embodiments described above with reference to FIGS. 18-20.

After the printing operation is completed and the loose powders are removed, an excitation resonant frequency can be applied to remove the support structure.

Figure 22:
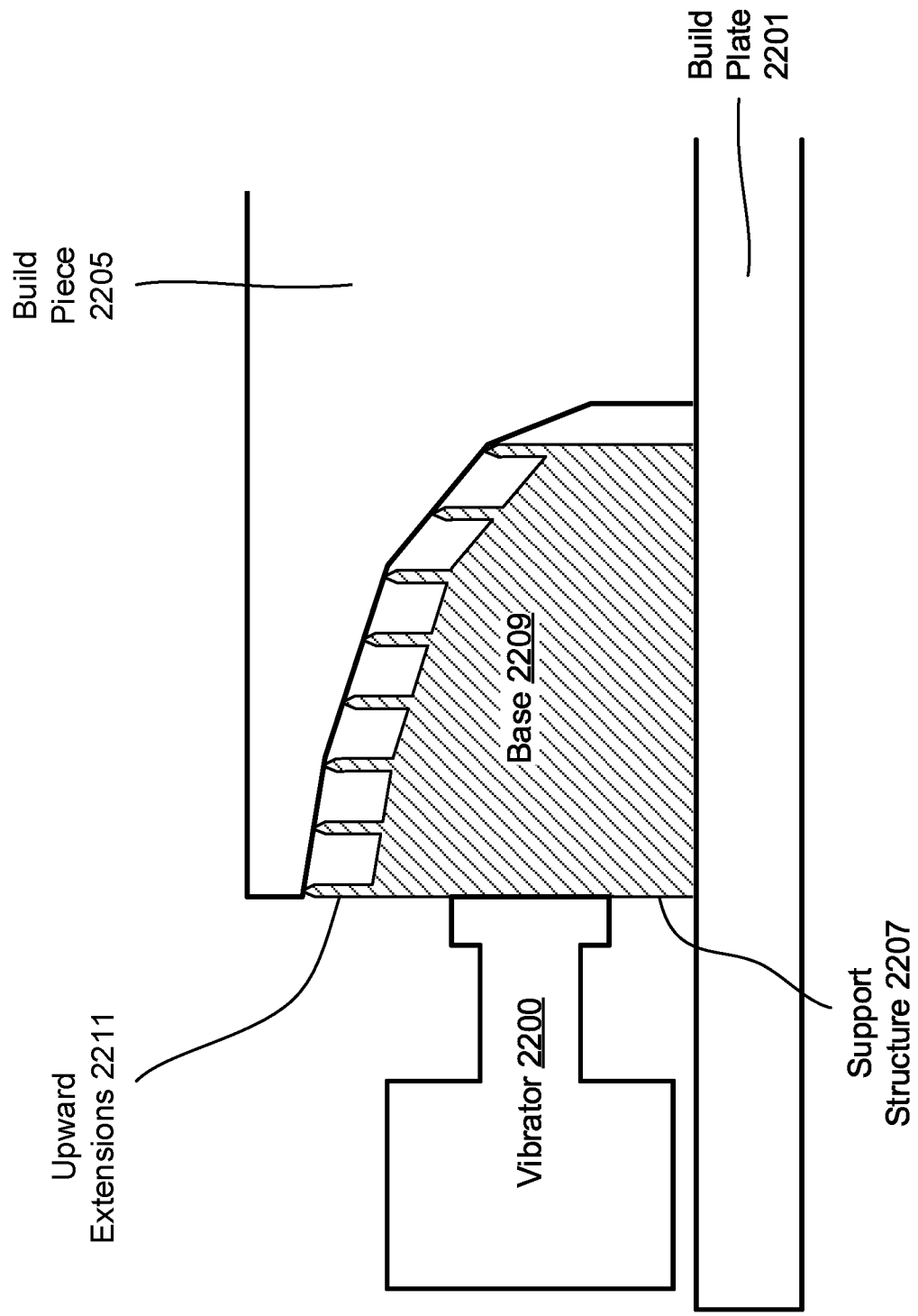
FIG. 22 illustrates an exemplary embodiment of a system including a vibrator that can apply a resonant frequency for removing support structures.

FIG. 22 illustrates an example system and method including a vibrator 2200 that can apply a resonance frequency for removing support structures including resonant structures. FIG. 22 shows a build plate 2201 and a build piece 2205 that have been removed from a powder bed after printing. FIG. 22 includes a support structure 2207 with a base 2209 and upward extensions 2211, similar to support structure 1800 of FIG. 18. Each upward extension 2211 can be a resonant structure, i.e., can resonate at a resonance frequency.

Vibrator 2200 can be coupled to base 2209 such that a resonance frequency can be applied to cause upward extensions 2211 to vibrate. In various embodiments, the resonance frequency can be applied via mechanical conduction directly or indirectly through a medium to the build piece, the support structure, the build plate, etc. Mechanical excitation can be generated, for example, by ultrasound transducers, piezoelectric transducers micro electro-mechanical systems, etc., of vibrator 2200. The transducer can be attached to build piece 2205, support structure 2207, build plate 2201, etc. The induced vibration can cause the support structure to vibrate with increasing amplitude until the ends break off from the build piece and the build plate.

In various embodiments, further control of the support structure break-off can be achieved by a variant adaptation of this design with multiple resonant nodes. For instance, support extrusions of different lengths, widths, and/or taper may be applied to different areas of the build piece. This can allow for the selective removal of supports by applying different excitation frequencies. A medium could also be used for complete or partial immersion of the build piece to speed the break-off process. Sound waves and heating may also be used to drive the break-off process. For instance, an entire part can be heated to a temperature approaching that of its alloy melting point, and in this way a support, or support structure, can be weakened for easy removal.

In various embodiments, support structure can be formed such that an interface (e.g., contact points) between the support structure and the build piece can heat substantially when an electrical current is applied. This can allow easy removal of the support structure via the application of electrical current.

Figure 23:
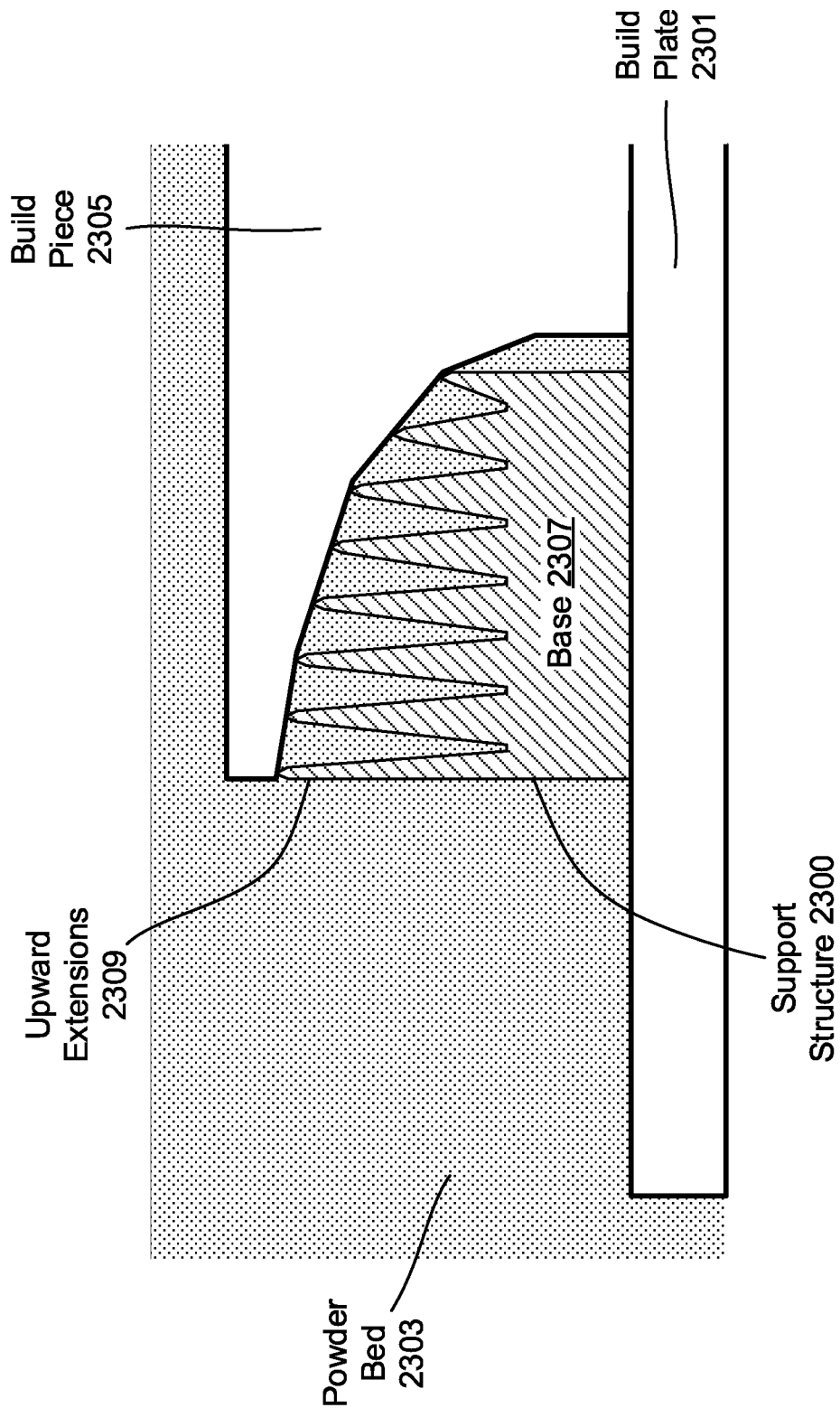
FIG. 23 illustrates an exemplary embodiment of a support structure including portions configured to be melted by applying electrical current.

FIG. 23 illustrates an example support structure 2300 including portions configured to be melted by applying electrical current to remove the support structure. FIG. 23 shows a build plate 2301, a powder bed 2303, and a build piece 2305. Support structure 2300 can include a base 2307 and upward extensions 2309. The ends of upward extensions 2309 can form attachments with build piece 2305 at the interface, which can support the build piece. Each upward extension 2309 can be configured such that an electrical current applied across the attachments between the upward extension and build piece 2305 can cause the attachments to melt. In this way, for example, applying an electrical current can cause the ends of upward extensions 2309 to melt away from build piece 2305, thus removing support structure 2300 from the build piece.

In various embodiments, support structures can includes extensions of fixed length, width and taper. In various embodiments, extensions may have different lengths and/or widths. In various embodiments, the contact points can be tapered such that the contact points provide a relatively high electrical resistance compared to the remaining portions of the support structure and build piece. In various embodiments, extensions may have different tapers, or no taper, for example.

Figure 24:
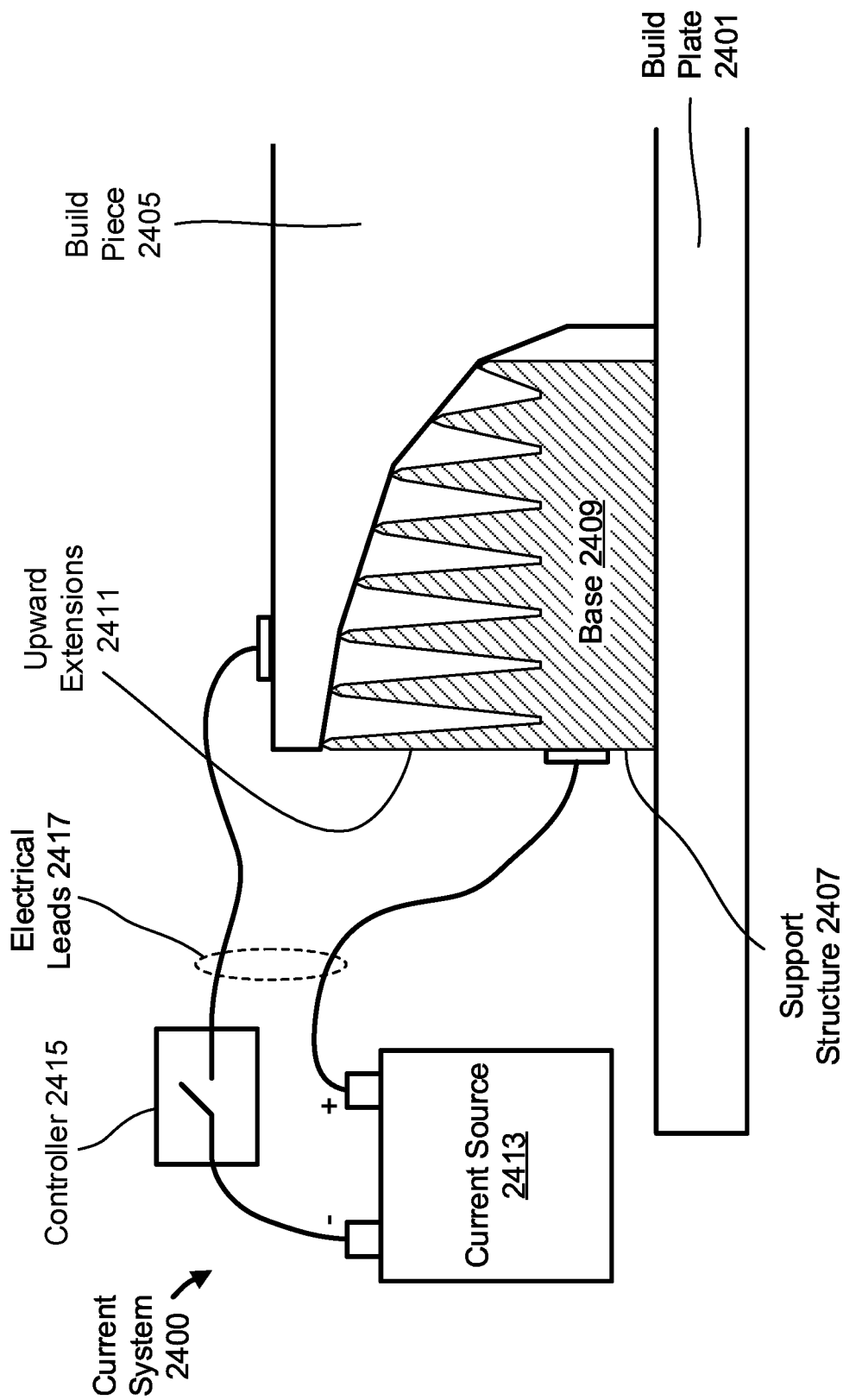
FIG. 24 illustrates an exemplary embodiment of an electrical current system for removing support structures.

FIG. 24 illustrates an example system and method including a current system 2400 for removing support structures that include portions configured to be melted by applying electrical current to remove the support structure. FIG. 24 shows a build plate 2401 and a build piece 2405 that have been removed from a powder bed after printing. FIG. 24 includes a support structure 2407 with a base 2409 and upward extensions 2411. Each upward extension 2411 can be configured such that the ends melt when a current is applied across them.

Current system 2400 include a current source 2413, a controller 2415 (e.g. a switch), and electrical leads 2417. Electrical leads 2417 can be coupled to base 2409 and build piece 2405 such that an electrical current from current source 2413 flows through the ends of upward extensions 2411 when controller 2415 is closed. In this way, the ends of upward extensions 2411 can be melted and support structure 2407 can be removed from build piece 2405.

Figure 25:
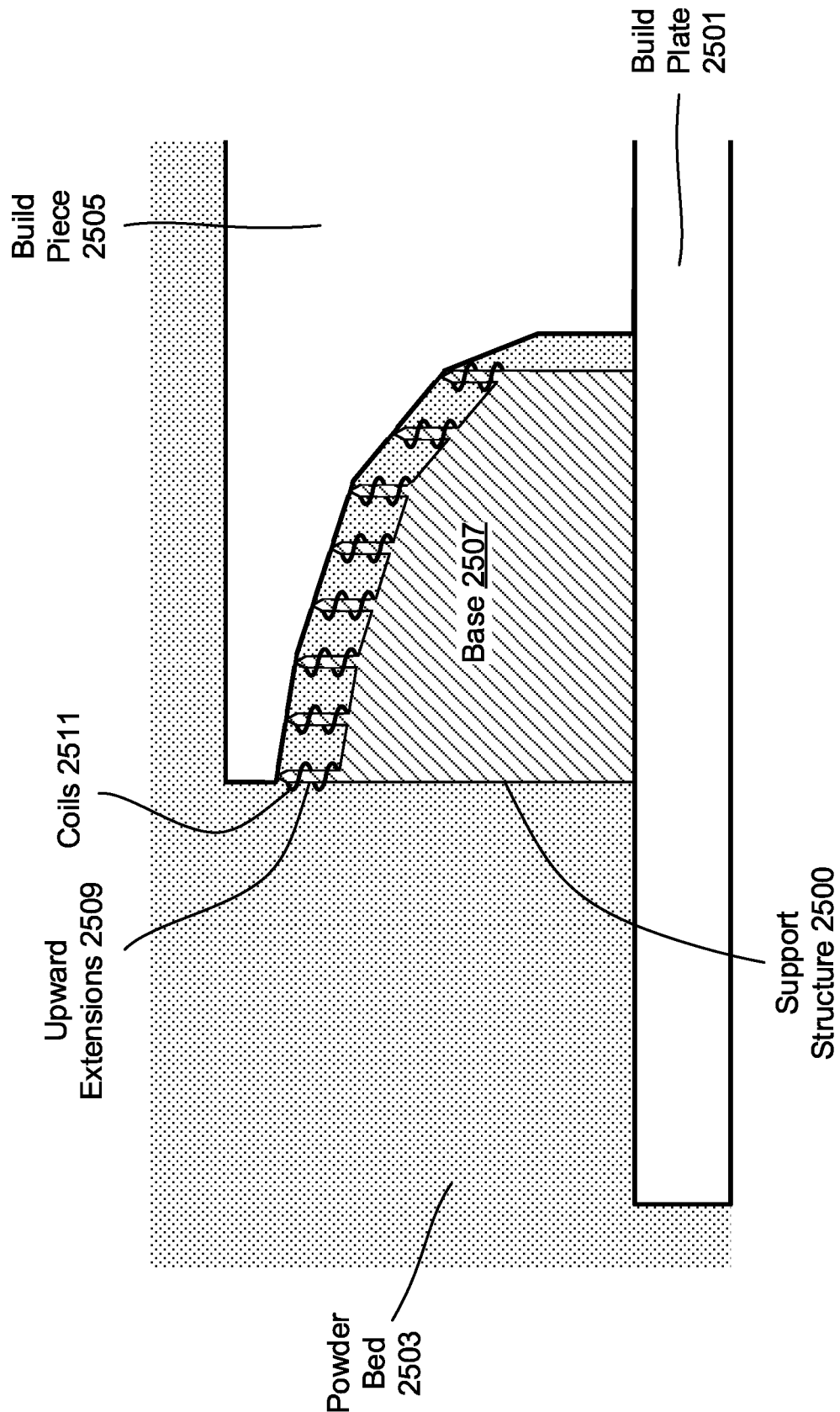
FIG. 25 illustrates an exemplary embodiment of a support structure including portions configured to be excited by applying electrical current.

FIG. 25 an example support structure 2500 including portions configured to be excited by applying electrical current to remove the support structure, and an example system and method for removing these types of support structures. FIG. 25 shows a build plate 2501, a powder bed 2503, and a build piece 2505. Support structure 2500 can include a base 2507 and upward extensions 2509. The ends of upward extensions 2509 can form attachments with build piece 2505 at the interface, which can support the build piece. A coil 2511 can be formed to wrap around each upward extension 2509. Coils 2511 can be metal coils that can be formed, for example, by fusing metal powder. In this example, each upward extension 2509 can be configured to be excited by an application of electrical current through the corresponding coil 2511. For example, each upward extension 2509 and coil 2511 can be configured as a solenoid structure, such that application of an alternating electrical current to the coil causes the upward extension to move up and down along the axis of the coil. In this way, for example, the attachment between each upward extension 2509 and build piece 2505 can be weakened and broken to remove support structure 2500.

In this example, support structure 2500 includes extensions and coils configured as a solenoid structure. In various embodiments, support structures can include other types of elements that may be excited to weaken the attachment between the support structure and the build piece and/or the build plate. Such elements may include, for example, a combination of electrically conductive portions formed, for example, by fusing metal powder, and electrically insulating portions formed, for example, by applying an insulating binding agent, by depositing an insulating non-powder support material, etc. In this way, for example, many different types of elements may be formed that would allow the support structure to be more easily removed from the build piece and/or build plate.

Figure 26A:
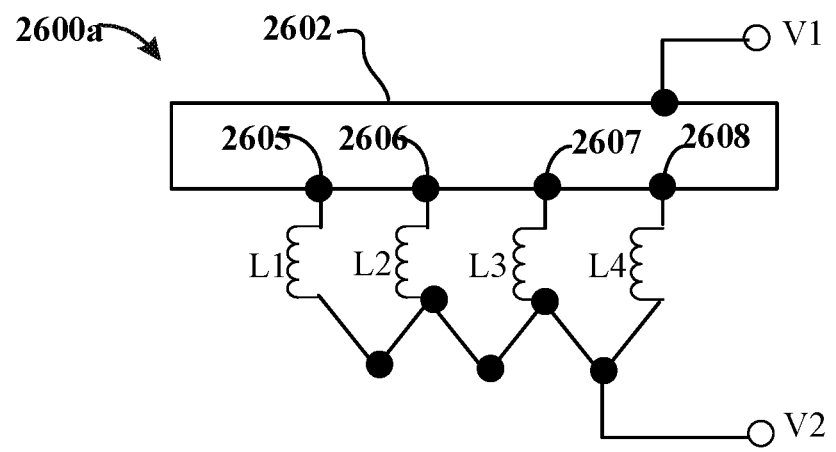
FIG. 26A illustrates a circuit model of an embodiment for electromagnetic removal of structure supports.

FIG. 26A illustrates a circuit model 2600a of an embodiment for electromagnetic removal of structure supports. The circuit model 2600a includes inductors L1-L4, each electrically coupled between a potential V2 and a metallic bar 2602. The metallic bar 2600a is electrically coupled to a potential V1. The inductors L1-L4 can model or represent additively manufactured coils which can generate magnetic fields in response to an applied current flowing in the inductors (coils) L1-L4.

In circuit model 2600a, the circuit nodes where inductors L1-L4 connect to the metallic bar 2600a can represent support structure attachment points. Support structures can be printed with coils, represented by the inductors L1-L4, at the attachment points. These coils, represented by inductors L1-L4, can behave like electromagnets when energized by an electric current. An electric current can flow when an electric potential (external voltage supply) is connected across the nodes represented by potentials V2 and V1. In this way induced magnetic fields are produced by the coils represented by inductors L1-L4.

By placing the part represented by circuit model 2600a in an external magnetic field, a force can exist between the external magnetic field and an induced magnetic field in the coils. This force can be used to break the supports at the attachment points. For instance, if the force is repulsive, then repulsive (breaking) forces can be exerted at the attachment points. The force can be repulsive or attractive depending upon the direction of current flow, as shown in FIG. 26B.

Figure 26B:
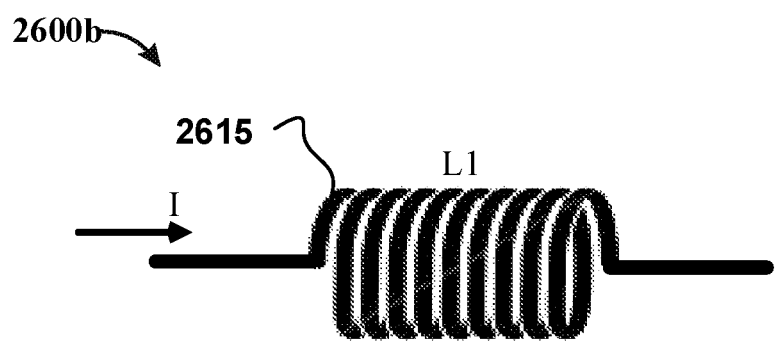
FIG. 26B illustrates a coil realization of an inductor modeled in the embodiment of FIG. 26A.

FIG. 26B illustrates a coil realization 2600b of an inductor modeled in the embodiment of FIG. 26A. The coil realization 2600b is a coil 2615 which can represent an inductor, such as inductor L1 of FIG. 26B. According to electromagnetic theory and the laws of physics, a magnetic field will be induced in the coil 2615 when the coil 2615 is energized with a flowing current I. As one of ordinary skill in the art can appreciate, the direction of the induced magnetic field can depend on the direction of current flow according to a "right hand rule." Additionally, current can have both DC (direct current) and AC (alternating current) components.

Although FIGS. 26A and 26B show the use of additively manufactured coils for converting electromagnetic energy into mechanical energy for breaking supports at interfaces, other electromagnetic or electrical approaches are possible. For instance, instead of using coils, additively manufactured metallic loops can be formed at the interfaces. In the presence of an external magnetic field, a current flowing through a loop can exert a torque. Alternatively, instead of relying on the conversion of electromagnetic energy into mechanical energy, one can envision support structures constructed of additively manufactured fuses. When subjected to a current, the fuses can be blown so as to break an interface of the temporary support.

Figure 27A:
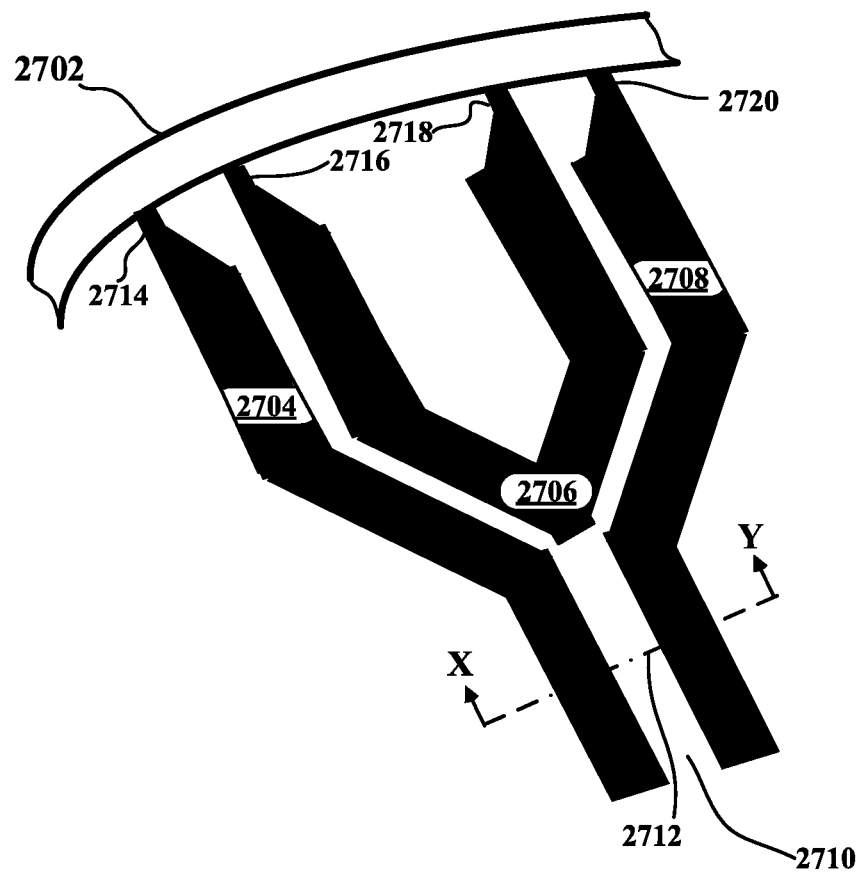
FIG. 27A illustrates a removable support structure attached to a surface according to an embodiment.

FIG. 27A illustrates a removable support structure attached to a surface 2702 according to an embodiment. The removable support structure includes a support leg 2704, a support leg 2708, and a support structure segment 2706 located between the support legs 2704 and 2708. The support leg 2704 contacts the surface 2702 at an interface 2714. The support leg 2708 contacts the surface 2702 at an interface 2720. The support structure segment contacts the surface 2702 at interfaces 2716 and 2718 and forms a V-shape. Also, as shown in FIG. 27A, a cross section 2712 is taken between points X and Y.

Figure 27B:
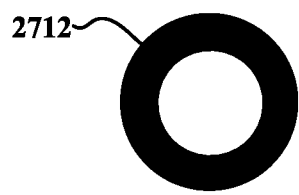
FIG. 27B illustrates a cross section of the support structure of the embodiment of FIG. 27A.

FIG. 27B illustrates a cross section 2712 of the removable support structure of the embodiment of FIG. 27A. As shown in FIG. 27B, the cross section 2712 can be an annulus shaped region. The removable support structure of FIGS. 27A and 27B can be designed as a thin, hollow section formed at the connection point interfaces 2714, 2716, 2718, and 2720. This can result in shell-like features at the connection point interfaces 2714, 2716, 2718, and 2720. Additionally, the shell-like features formed at the interfaces 2714, 2716, 2718, and 2720 can be designed to be thin so that they break upon application of a force above a certain threshold Alternatively, and additionally, the removable support structure of FIGS. 27A and 27B can be designed so that when a fluid, gas or liquid, is forced into an orifice 2710, the shell-like features break off and/or detach from the surface 2702.

Although the removable support structure of FIGS. 27A and 27B represents one approach for generating a removable structure, other removable structures are possible. For instance, another removable support structure can be based on the concept of a tuning fork. By using support structures which branch out at a surface and form tuning forks, vibrational energy can be applied to force removal. By applying a certain force to the base of a support structure having a tuning fork shape, the prongs of the tuning fork may resonate and hence break off.

In another embodiment, a way to avoid printing support structures can be to hold the powder together to act as support structure. Static charge may be applied to "fuse" the powder for the printing process. This can easily support overhanging structures. Additionally, a print bed orientation can be changed in the 3D printer to reduce the volume of powder to be held as support material during the print. This may, in turn, avail 3D printing of complex overhanging structures.

Upon completion of printing a first few layers of an overhanging structure, the static charge can be removed. This can result in a part without needing or having support structures, thereby requiring no post-processing operations to remove supports.

In other embodiments extremely fine lattice-based support structures and sponge-like support structures can be generated. By exposing extremely fine lattice-based support structures to acid, the support structures can be easily dissolved. Any material degradation can be pre-compensated by printing extra material.

In another embodiment, the expansion force from phase change between liquid and solid can be used to break support structures off the part. Liquid can get into the small spaces, then a phase change can be instigated by cooling the liquid to a solid. For instance, water, instead of air, can be forced into the connection point interfaces 2714, 2716, 2718, and 2720 of FIG. 27A; and when the water freezes, an expansive force due to the phase change can cause the connection point interfaces 2714, 2716, 2718, and 2720 to break.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other support structures and systems and methods for removal of support structures. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A support structure for supporting a surface of a build piece of a powder-bed fusion system, the support structure comprising:
    a first leg having a length, the first leg attached to the surface at a connection point interface, wherein a first portion of the length is proximate the connection point interface,
    a second portion of the length is further from the connection point interface than the first portion of the length; and
    an orifice formed in the second portion of the first leg and configured to provide a fluid entry therein such that the fluid applies a force to the first portion of the length of the first leg in order to detach the first portion from the surface.

2. The support structure of claim 1, wherein a wall thickness of the first portion of the length is less than a wall thickness of the second portion of the length, such that the first portion is configured to break in response to the applied force.

3. The support structure of claim 1, further comprising:
    a second leg, wherein the second leg is attached to the surface at a second connection point interface.

4. The support structure of claim 3, wherein the orifice is formed from the first leg and the second leg.

5. The support structure apparatus of claim 1, wherein the force is created by a phase change of the fluid.

6. The support structure of claim 5, wherein the phase change is from a liquid to a solid.

7. The support structure of claim 6, wherein the fluid is water.

* * * * *